(12) United States Patent
Takeda et al.

(10) Patent No.: US 11,641,684 B2
(45) Date of Patent: May 2, 2023

(54) HANDLING SINGLE UPLINK TRANSMISSIONS IN A DUAL CONNECTIVITY MODE

(71) Applicant: QUALCOMM Incorporated, San Diego, CA (US)

(72) Inventors: Kazuki Takeda, Tokyo (JP); Seyedkianoush Hosseini, San Diego, CA (US); Alberto Rico Alvarino, San Diego, CA (US); Wanshi Chen, San Diego, CA (US); Xiao Feng Wang, San Diego, CA (US); Peter Gaal, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 44 days.

(21) Appl. No.: 16/985,885

(22) Filed: Aug. 5, 2020

(65) Prior Publication Data
US 2021/0045173 A1    Feb. 11, 2021

Related U.S. Application Data

(60) Provisional application No. 62/885,008, filed on Aug. 9, 2019.

(51) Int. Cl.
*H04W 76/15* (2018.01)
*H04W 72/12* (2009.01)
(Continued)

(52) U.S. Cl.
CPC ............ *H04W 76/15* (2018.02); *H04L 5/0051* (2013.01); *H04L 25/0226* (2013.01);
(Continued)

(58) Field of Classification Search
CPC .............. H04W 76/15; H04W 72/042; H04W 72/0446; H04W 72/1257; H04W 72/1268;
(Continued)

(56) References Cited

U.S. PATENT DOCUMENTS

2015/0208366 A1* 7/2015 Papasakellariou .... H04W 76/15
370/311
2018/0367230 A1* 12/2018 Su ......................... H04W 76/16
(Continued)

FOREIGN PATENT DOCUMENTS

KR          20210017958 A  * 10/2019

OTHER PUBLICATIONS

"3rd Generation Partnership Project; Technical Specification Group Radio Access Network; General Aspects for User Equipment (UE) Radio Frequency (RF) for NR(Release 16)", 3GPP Standard, Technical Report, 3GPP TR 38.817-01, 3rd Generation Partnership Project (3GPP), Mobile Competence Centre, 650, Route Des Lucioles, F-06921 Sophia-Antipolis Cedex, France, vol. RAN WG4. No. V16.0.0, (Jun. 2019), pp. 1-94. XP051754535, [retrieved on Jul. 3, 2019] Section 8.8.2.
(Continued)

*Primary Examiner* — Candal Elpenord
(74) *Attorney, Agent, or Firm* — Harrity & Harrity, LLP

(57) ABSTRACT

Various aspects of the present disclosure generally relate to wireless communication. In some aspects, a user equipment (UE) may determine whether an uplink communication for a first radio access technology (RAT) has been dynamically scheduled or semi-statically configured, wherein the UE is in a dual connectivity mode using the first RAT and a second RAT. The UE may identify an uplink subframe for transmission of the uplink communication based at least in part on whether the uplink communication has been dynamically scheduled or semi-statically configured, and based at least in
(Continued)

part on a downlink-reference uplink-downlink configuration. The UE may transmit the uplink communication in the identified uplink subframe. Numerous other aspects are provided.

29 Claims, 12 Drawing Sheets

(51) Int. Cl.
| | | |
|---|---|---|
| *H04W 72/04* | (2009.01) | |
| *H04L 25/02* | (2006.01) | |
| *H04L 5/00* | (2006.01) | |
| *H04W 74/08* | (2009.01) | |
| *H04W 74/02* | (2009.01) | |
| *H04W 74/00* | (2009.01) | |
| *H04W 72/1268* | (2023.01) | |
| *H04W 72/0446* | (2023.01) | |

(52) U.S. Cl.
CPC ..... *H04W 72/042* (2013.01); *H04W 72/0446* (2013.01); *H04W 72/1257* (2013.01); *H04W 72/1268* (2013.01); *H04W 74/008* (2013.01); *H04W 74/02* (2013.01); *H04W 74/0833* (2013.01)

(58) Field of Classification Search
CPC ... H04W 72/04; H04W 74/008; H04W 74/02; H04W 74/0833; H04L 5/0051; H04L 25/0226
USPC .................................................. 370/329–330
See application file for complete search history.

(56) References Cited

U.S. PATENT DOCUMENTS

| | | | | |
|---|---|---|---|---|
| 2019/0149365 | A1* | 5/2019 | Chatterjee | H04L 25/0226 370/329 |
| 2019/0182899 | A1* | 6/2019 | Ye | H04W 8/22 |
| 2019/0261454 | A1* | 8/2019 | Xiong | H04L 25/0328 |
| 2020/0351865 | A1* | 11/2020 | Choi | H04L 1/1854 |
| 2021/0037482 | A1* | 2/2021 | Shin | H04W 72/0413 |
| 2021/0045174 | A1* | 2/2021 | Choi | H04L 5/14 |

OTHER PUBLICATIONS

International Search Report and Written Opinion—PCT/US2020/045156—ISA/EPO—dated Oct. 14, 2020.
Qualcomm Incorporated: "Ennancements for EN-DC Single-Tx IDM Operation" 3GPP Draft, R1-1907305, 3GPP TSG-RAN WG1 #97, Enhancements for EN-DC Single-Tx TDM Operation, 3rd Generation Partnership Project (3GPP), Mobile Competence Centre, 650, Route Des Lucioles, F-06921 Sophia-Antipolis Cedex, vol. RAN WG1, No. Reno, Nevada, U.S.A, May 13, 2019-May 17, 2019, May 13, 2019 (May 13, 2019), XP051728745, pp. 1-5, Retrieved from the Internet: URL: http://www.3gpp.org/ftp/Meetings%5F3GPP%5FSYNC/RAN1/Docs/R1%2D1907305%2Ezip [retrieved on May 13, 2019] Section 2.
ZTE Corporation: "Discussion on Single Tx switched uplink solution for EN-DC", 3GPP Draft, R1-1906421, 3GPP TSG RAN WG1 Meeting #97, Discussion on Single Tx Switched Uplink Solution for EN-DC, 3rd Generation Partnership Project (3GPP), Mobile Competence Centre, 650, Route Des Lucioles, F-06921 Sophia-Antipo vol. RAN WG1, No. Reno, USA, May 13, 2019-May 17, 2019, May 13, 2019 (May 13, 2019), XP051727871, pp. 1-7, Retrieved from the Internet: URL: http://www.3gpp.org/ftp/Meetings%5F3GPP%5FSYNC/RAN1/Docs/R1%2D1906421%2Ezip[retrieved on May 13, 2019]Sections 2.4 and 2.6.

* cited by examiner

HANDLING SINGLE UPLINK TRANSMISSIONS IN A DUAL CONNECTIVITY MODE

CROSS-REFERENCE TO RELATED APPLICATION

This Patent Application claims priority to U.S. Provisional Patent Application No. 62/885,008, filed on Aug. 9, 2019, entitled "HANDLING SINGLE UPLINK TRANSMISSIONS IN A DUAL CONNECTIVITY MODE," and assigned to the assignee hereof. The disclosure of the prior Application is considered part of and is incorporated by reference in this Patent Application.

FIELD OF THE DISCLOSURE

Aspects of the present disclosure generally relate to wireless communication and to techniques and apparatuses for handling single uplink transmissions in a dual connectivity mode.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, etc.). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a new radio (NR) BS, a 5G Node B, and/or the like.

The above multiple access technologies have been adopted in various telecommunication standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation.

SUMMARY

In some aspects, a method of wireless communication, performed by a user equipment (UE), may include determining whether an uplink communication for a first radio access technology (RAT) has been dynamically scheduled or semi-statically configured, wherein the UE is in a dual connectivity mode using the first RAT and a second RAT; identifying an uplink subframe for transmission of the uplink communication based at least in part on whether the uplink communication has been dynamically scheduled or semi-statically configured and based at least in part on a downlink-reference uplink-downlink configuration; and transmitting the uplink communication in the identified uplink subframe.

In some aspects, a method of wireless communication, performed by a UE, may include determining a type of an uplink communication for a first RAT, wherein the UE is in a dual connectivity mode using the first RAT and a second RAT; identifying a subframe for transmission of the uplink communication based at least in part on the type of the uplink communication and based at least in part on a downlink-reference uplink-downlink configuration; and transmitting the uplink communication in the identified subframe.

In some aspects, a method of wireless communication, performed by a UE, may include identifying one or more symbols, in an uplink subframe designated as uplink by a downlink-reference uplink-downlink configuration, in which the UE is not permitted to transmit an uplink communication for a first RAT, wherein the UE is in a dual connectivity mode using the first RAT and a second RAT; and transmitting an uplink communication for the second RAT in the identified one or more symbols.

In some aspects, a UE for wireless communication may include memory and one or more processors operatively coupled to the memory. The memory and the one or more processors may be configured to determine whether an uplink communication for a first RAT has been dynamically scheduled or semi-statically configured, wherein the UE is in a dual connectivity mode using the first RAT and a second RAT; identify an uplink subframe for transmission of the uplink communication based at least in part on whether the uplink communication has been dynamically scheduled or semi-statically configured and based at least in part on a downlink-reference uplink-downlink configuration; and transmit the uplink communication in the identified uplink subframe.

In some aspects, a UE for wireless communication may include memory and one or more processors operatively coupled to the memory. The memory and the one or more processors may be configured to determine a type of an uplink communication for a first RAT, wherein the UE is in a dual connectivity mode using the first RAT and a second RAT; identify a subframe for transmission of the uplink communication based at least in part on the type of the uplink communication and based at least in part on a downlink-reference uplink-downlink configuration; and transmit the uplink communication in the identified subframe.

In some aspects, a UE for wireless communication may include memory and one or more processors operatively coupled to the memory. The memory and the one or more processors may be configured to identify one or more symbols, in an uplink subframe designated as uplink by a downlink-reference uplink-downlink configuration, in which the UE is not permitted to transmit an uplink communication for a first RAT, wherein the UE is in a dual connectivity mode using the first RAT and a second RAT; and transmit an uplink communication for the second RAT in the identified one or more symbols.

In some aspects, a non-transitory computer-readable medium may store one or more instructions for wireless communication. The one or more instructions, when executed by one or more processors of a UE, may cause the one or more processors to: determine whether an uplink communication for a first RAT has been dynamically scheduled or semi-statically configured, wherein the UE is in a dual connectivity mode using the first RAT and a second RAT; identify an uplink subframe for transmission of the uplink communication based at least in part on whether the uplink communication has been dynamically scheduled or semi-statically configured and based at least in part on a downlink-reference uplink-downlink configuration; and transmit the uplink communication in the identified uplink subframe.

In some aspects, a non-transitory computer-readable medium may store one or more instructions for wireless communication. The one or more instructions, when executed by one or more processors of a UE, may cause the one or more processors to: determine a type of an uplink communication for a first RAT, wherein the UE is in a dual connectivity mode using the first RAT and a second RAT; identify a subframe for transmission of the uplink communication based at least in part on the type of the uplink communication and based at least in part on a downlink-reference uplink-downlink configuration; and transmit the uplink communication in the identified subframe.

In some aspects, a non-transitory computer-readable medium may store one or more instructions for wireless communication. The one or more instructions, when executed by one or more processors of a UE, may cause the one or more processors to: identify one or more symbols, in an uplink subframe designated as uplink by a downlink-reference uplink-downlink configuration, in which the UE is not permitted to transmit an uplink communication for a first RAT, wherein the UE is in a dual connectivity mode using the first RAT and a second RAT; and transmit an uplink communication for the second RAT in the identified one or more symbols.

In some aspects, an apparatus for wireless communication may include means for determining whether an uplink communication for a first RAT has been dynamically scheduled or semi-statically configured, wherein the apparatus is in a dual connectivity mode using the first RAT and a second RAT; means for identifying an uplink subframe for transmission of the uplink communication based at least in part on whether the uplink communication has been dynamically scheduled or semi-statically configured and based at least in part on a downlink-reference uplink-downlink configuration; and means for transmitting the uplink communication in the identified uplink subframe.

In some aspects, an apparatus for wireless communication may include means for determining a type of an uplink communication for a first RAT, wherein the apparatus is in a dual connectivity mode using the first RAT and a second RAT; means for identifying a subframe for transmission of the uplink communication based at least in part on the type of the uplink communication and based at least in part on a downlink-reference uplink-downlink configuration; and means for transmitting the uplink communication in the identified subframe.

In some aspects, an apparatus for wireless communication may include means for identifying one or more symbols, in an uplink subframe designated as uplink by a downlink-reference uplink-downlink configuration, in which the apparatus is not permitted to transmit an uplink communication for a first RAT, wherein the apparatus is in a dual connectivity mode using the first RAT and a second RAT; and means for transmitting an uplink communication for the second RAT in the identified one or more symbols.

Aspects generally include a method, apparatus, system, computer program product, non-transitory computer-readable medium, user equipment, base station, wireless communication device, and/or processing system as substantially described with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
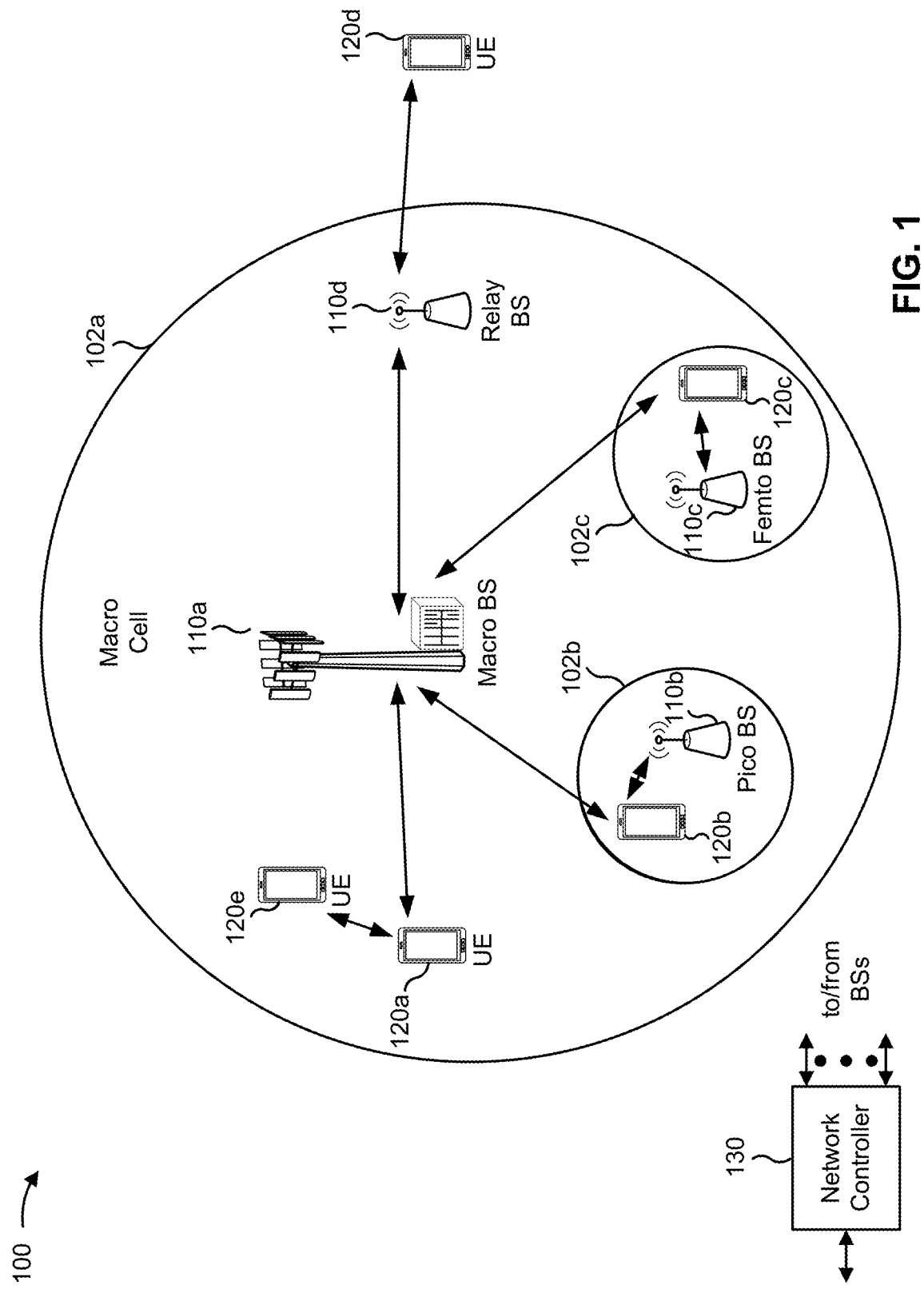
FIG. 1 is a diagram illustrating an example of a wireless communication network, in accordance with various aspects of the present disclosure.

For a type 1 UE operating in a single uplink transmission mode and an Evolved Universal Terrestrial Radio Access (EUTRA) New Radio (NR) Dual Connectivity (ENDC or EN-DC) mode and configured with a time-division duplex (TDD) primary cell (PCell), if there is a collision between an LTE physical uplink shared channel (PUSCH) communication and an NR PUSCH communication, then the UE may drop the NR PUSCH communication and may transmit the LTE PUSCH communication. By dropping NR PUSCH communications in favor of LTE PUSCH communications in uplink subframes designated as uplink by a downlink (DL)-reference uplink-downlink (UL/DL) configuration, the UE may avoid a collision. However, some other LTE uplink communications may be handled differently. If such LTE uplink communications are permitted on all UL subframes of an LTE TDD UL/DL configuration (e.g., regardless of whether those UL subframes are designated as UL by the DL-reference UL/DL configuration), then the opportunities for NR uplink communications may be highly limited due to the number of such LTE UL communications, thereby degrading NR performance. However, if such LTE UL communications are limited to UL subframes designated as UL by the DL-reference UL/DL configuration, then the opportunity for transmission of such LTE UL communications may be limited, which may degrade performance of LTE communications and cause interference and congestion on the UL subframes designated as UL by the DL-reference UL/DL configuration. Some techniques and apparatuses described herein address these and other issues, and permit flexible and efficient transmission of uplink communications for a UE operating in a single transmission mode in ENDC with a TDD PCell.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, etc. (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. ABS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, etc.

Wireless network 100 may be a heterogeneous network that includes BSs of different types, e.g., macro BSs, pico BSs, femto BSs, relay BSs, etc. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, etc. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, etc., that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

In some examples, access to the air interface may be scheduled, wherein a scheduling entity (e.g., a base station) allocates resources for communication among some or all devices and equipment within the scheduling entity's service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity.

Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided merely as an example. Other examples may differ from what is described with regard to FIG. 1.

Figure 2:
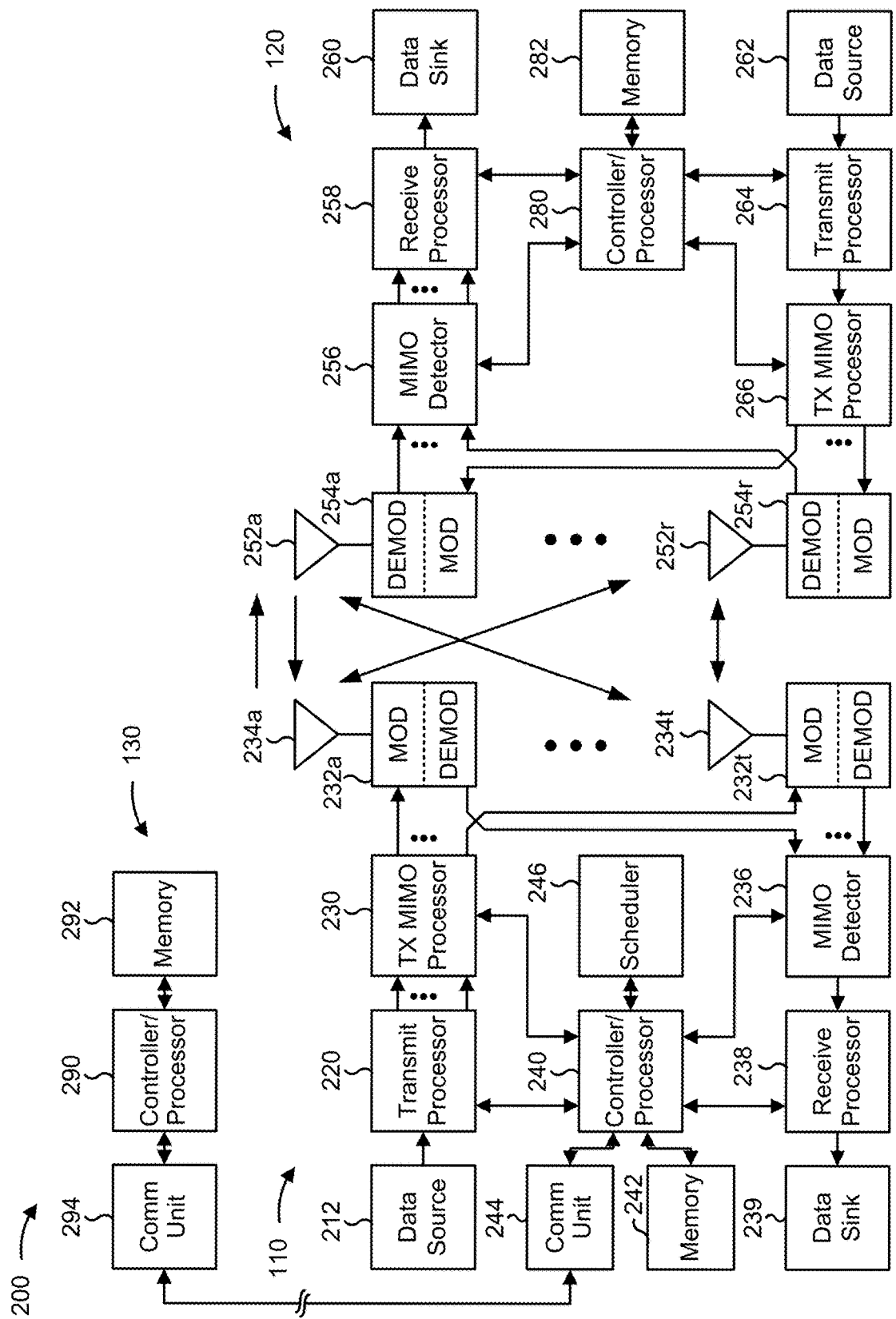
FIG. 2 is a diagram illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T>1 and R>1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI), etc.) and control information (e.g., CQI requests, grants, upper layer signaling, etc.) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM, etc.) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), etc. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, etc.) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, etc.), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with handling single uplink transmissions in a dual connectivity mode, as described in more detail elsewhere herein. For example, controller/processor 240 of base station 110, controller/processor 280 of UE 120, and/or any other component(s) of FIG. 2 may perform or direct operations of, for example, process 1000 of FIG. 10, process 1100 of FIG. 11, process 1200 of FIG. 12, and/or other processes as described herein. Memories 242 and 282 may store data and program codes for base station 110 and UE 120, respectively. The stored program codes, when executed by processor 280 and/or other processors and modules at UE 120, may cause the UE 120 to perform operations described with respect to process 1000 of FIG. 10, process 1100 of FIG. 11, process 1200 of FIG. 12, and/or other processes as described herein. A scheduler 246 may schedule UEs for data transmission on the downlink and/or uplink.

In some aspects, UE 120 may include means for determining whether an uplink communication for a first RAT has been dynamically scheduled or semi-statically configured, wherein the UE 120 is in a dual connectivity mode using the first RAT and a second RAT; means for identifying an uplink subframe for transmission of the uplink communication based at least in part on whether the uplink communication has been dynamically scheduled or semi-statically configured and based at least in part on a downlink-reference uplink-downlink configuration; means for transmitting the uplink communication in the identified uplink subframe; and/or the like. Additionally, or alternatively, UE 120 may include means for determining a type of an uplink communication for a first RAT, wherein the UE 120 is in a dual connectivity mode using the first RAT and a second RAT; means for identifying a subframe for transmission of the uplink communication based at least in part on the type of the uplink communication and based at least in part on a downlink-reference uplink-downlink configuration; means for transmitting the uplink communication in the identified subframe; and/or the like. Additionally, or alternatively, UE 120 may include means for identifying one or more symbols, in an uplink subframe designated as uplink by a downlink-reference uplink-downlink configuration, in which the UE 120 is not permitted to transmit an uplink communication for a first RAT, wherein the UE 120 is in a dual connectivity mode using the first RAT and a second RAT; means for transmitting an uplink communication for the second RAT in the identified one or more symbols; and/or the like. In some aspects, such means may include one or more components of UE 120 described in connection with FIG. 2.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of processor 280.

As indicated above, FIG. 2 is provided merely as an example. Other examples may differ from what is described with regard to FIG. 2.

Figure 3:
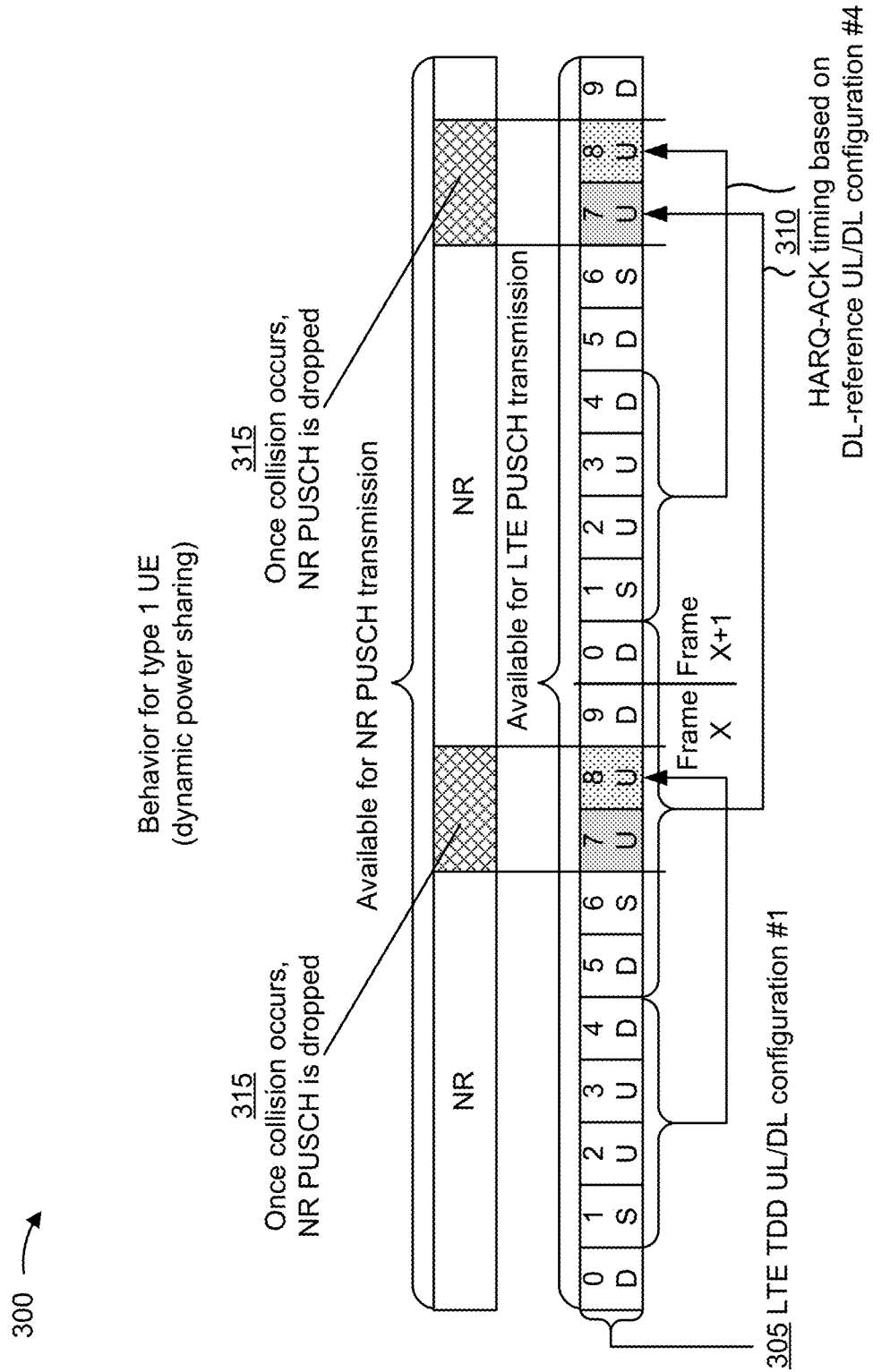
FIG. 3 is a diagram illustrating an example of behavior of a type 1 UE for handling single uplink transmissions in a dual connectivity mode.

FIG. 3 is a diagram illustrating an example 300 of behavior of a type 1 UE (e.g., a UE with a dynamic power sharing capability) for handling single uplink transmissions in a dual connectivity mode.

In NR, a UE 120 may connect to an LTE cell and an NR cell using dual connectivity. For example, the UE 120 may operate in an Evolved Universal Terrestrial Radio Access (EUTRA) New Radio (NR) Dual Connectivity (ENDC or EN-DC) mode. In the ENDC mode, the UE 120 may communicate using an LTE RAT for a master cell group (e.g., including a primary cell) and may communicate using an NR RAT for a secondary cell group (e.g., including one or more secondary cells). In some cases, a UE 120 operating in an ENDC mode may also operate in a single transmission mode, where the UE 120 is only capable of transmitting a single uplink transmission at a time. The UE 120 may be a type 1 UE that is capable of using dynamic power sharing for uplink transmissions, or may be a type 2 UE that is not capable of using dynamic power sharing for uplink transmissions. In some cases, the single transmission mode may be referred to as single transmission (tx) switched uplink.

In some cases, the LTE primary cell (PCell) (e.g., in the master cell group) may be configured with frame structure type 2, which uses time-division duplexing (TDD). Thus, the UE 120 may operate using single transmission switched uplink in ENDC with a TDD PCell. In this case, the UE 120 may be configured with a TDD UL/DL configuration (e.g., for the LTE PCell) that indicates a pattern of uplink (UL) subframes, downlink (DL) subframes, and/or special (S) subframes (e.g., for switching between UL and DL subframes) in a radio frame. The UE 120 may also be configured with a downlink-reference uplink-downlink configuration (sometimes referred to as a DL-reference UL/DL configuration or a DL-reference UL-DL configuration). The DL-reference UL/DL configuration may indicate a timing for hybrid automatic repeat request (HARQ) feedback (e.g., on the LTE PCell) for a physical downlink shared channel (PDSCH) on the serving cell. HARQ feedback for the PDSCH may sometimes be referred to as acknowledgement (ACK) or negative acknowledgement (NACK) (collectively, ACK/NACK) feedback. For example, the DL-reference UL/DL configuration may indicate one or more uplink subframes of the TDD UL/DL configuration that are designated as uplink subframes for HARQ feedback of downlink LTE communications. The subframes designated as uplink subframes for HARQ feedback by the DL-reference UL/DL configuration may be referred to herein as uplink subframes designated as uplink.

As shown by reference number 305, in example 300, a type 1 UE (e.g., with a dynamic power sharing capability) is configured with LTE TDD UL/DL configuration #1, which has an UL/DL/S subframe pattern of D, S, U, U, D, D, S, U, U, D (two consecutive frames with this pattern are shown). Furthermore, as shown by reference number 310, the type 1 UE is configured with DL-reference UL/DL configuration #4, which indicates that HARQ feedback subframes 1 through 4 (shown as S, U, U, D) of a frame are to be transmitted in subframe 8 of the frame, and that HARQ feedback for subframes 5 through 9 of a prior frame (Frame X) and subframe 0 of the current frame (Frame X+1) (shown as D, S, U, U, D, D) are to be transmitted in subframe 7 of the frame. In this example, subframes 7 and 8 are uplink subframes designated as UL by the DL-reference UL/DL configuration. The LTE TDD UL/DL configuration and the DL-reference UL/DL configuration described herein are provided as examples, and the UE may be configured with another LTE TDD UL/DL configuration and/or another DL-reference UL/DL configuration.

As shown by reference number 315, for a type 1 UE operating in a single uplink transmission mode in ENDC with a TDD PCell, if there is a collision between an uplink communication on LTE (e.g., an LTE physical uplink shared channel (PUSCH) communication) and an uplink communication on NR (e.g., an NR PUSCH communication), then the UE may drop the NR PUSCH communication and may transmit the LTE PUSCH communication. For example, if the UE is scheduled to transmit HARQ feedback for PDSCH in an LTE PUSCH communication in a subframe designated as UL by the DL-reference UL/DL configuration, then the UE may drop the NR PUSCH communication in that subframe. Because a type 1 UE has tight coupling between components that control NR communications and components that control LTE communications, the type 1 UE may be capable of detecting collisions and dropping NR PUSCH communications in the event of a collision, unlike a type 2 UE described below in connection with FIG. 4.

By dropping NR PUSCH communications in favor of LTE PUSCH communications in the uplink subframes designated as uplink by the DL-reference UL/DL configuration, the UE may avoid a collision. However, other LTE uplink communications, such as LTE physical random access channel (PRACH) communications, LTE sounding reference signals (SRS), and/or LTE physical uplink control channel (PUCCH) communications (e.g., including a scheduling request (SR), channel state information (CSI) feedback, and/or the like), may be handled differently (e.g., due to different priorities). If such LTE UL communications are permitted on all UL subframes of the LTE TDD UL/DL configuration (e.g., regardless of whether those UL subframes are designated as UL by the DL-reference UL/DL configuration), then the opportunities for NR uplink communications may be highly limited due to the number of such LTE UL communications, thereby degrading NR performance. However, if such LTE UL communications are limited to UL subframes designated as UL by the DL-reference UL/DL configuration, then the opportunity for transmission of such LTE UL communications may be limited (e.g., to two subframes in example 300), which may degrade performance of LTE communications and cause interference and congestion on the UL subframes designated as UL by the DL-reference UL/DL configuration. Some techniques and apparatuses described herein address these and other issues, and permit flexible and efficient transmission of uplink communications for a UE operating in a single transmission mode in ENDC with a TDD PCell.

As indicated above, FIG. 3 is provided merely as an example. Other examples may differ from what is described with regard to FIG. 3.

Figure 4:
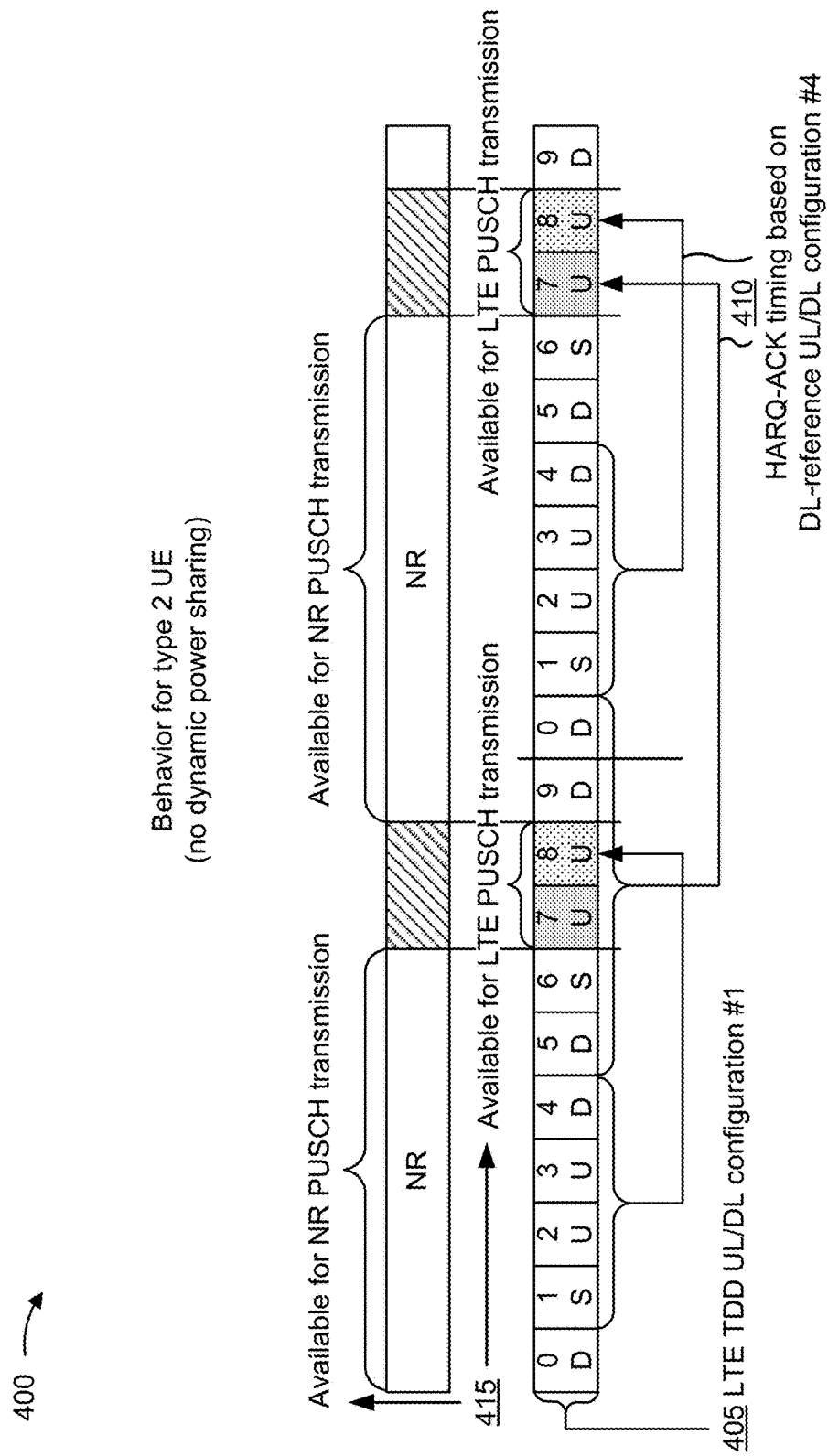
FIG. 4 is a diagram illustrating an example of behavior of a type 2 UE for handling single uplink transmissions in a dual connectivity mode.

FIG. 4 is a diagram illustrating an example 400 of behavior of a type 2 UE (e.g., a UE without a dynamic power sharing capability) for handling single uplink transmissions in a dual connectivity mode.

As shown by reference number 405, in example 400, a type 2 UE (e.g., without a dynamic power sharing capability) is configured with LTE TDD UL/DL configuration #1, as described above in connection with FIG. 3. Furthermore, as shown by reference number 410, the type 2 UE is configured with DL-reference UL/DL configuration #4, as described above in connection with FIG. 3.

As shown by reference number 415, for a type 2 UE operating in a single uplink transmission mode in ENDC with a TDD PCell, a first group of subframes may be reserved for and/or available for NR PUSCH communications (e.g., subframes 0 through 6 and subframe 9) and a second group of subframes (e.g., subframes 7 and 8) may be reserved for and/or available for LTE PUSCH communications. Because a type 2 UE does not have tight coupling between components that control NR communications and components that control LTE communications, the type 2 UE may not be capable of detecting collisions and dropping NR PUSCH communications in the event of a collision, as described above in connection with a type 1 UE.

In this configuration, the opportunity for LTE PUSCH communications may be limited (e.g., to two subframes), which may degrade LTE performance. Furthermore, the type 2 UE is not capable of transmitting NR PUSCH communications in the UL subframes designated as UL by the DL-reference UL/DL configuration (e.g., subframes 7 and 8 of example 400), even if the type 2 UE is not scheduled to transmit an LTE PUSCH communication in those UL subframes, which wastes network resources, reduces spectral efficiency, and degrades NR performance.

Also, as described above in connection with FIG. 3, other LTE uplink communications, such as LTE PRACH communications, LTE SRSs, and/or LTE PUCCH communications, may be handled differently (e.g., due to different priorities). If such LTE UL communications are permitted on all UL subframes of the LTE TDD UL/DL configuration, then the opportunities for NR uplink communications may be highly limited due to the number of such LTE UL communications, thereby degrading NR performance. However, if such LTE UL communications are limited to UL subframes designated as UL by the DL-reference UL/DL configuration, then the opportunity for transmission of such LTE UL communications may be limited (e.g., to two subframes in example 400), which may degrade performance of LTE communications. Some techniques and apparatuses described herein address these and other issues, and permit flexible and efficient transmission of uplink communications for a UE operating in a single transmission mode in ENDC with a TDD PCell.

As indicated above, FIG. 4 is provided merely as an example. Other examples may differ from what is described with regard to FIG. 4.

Figure 5:
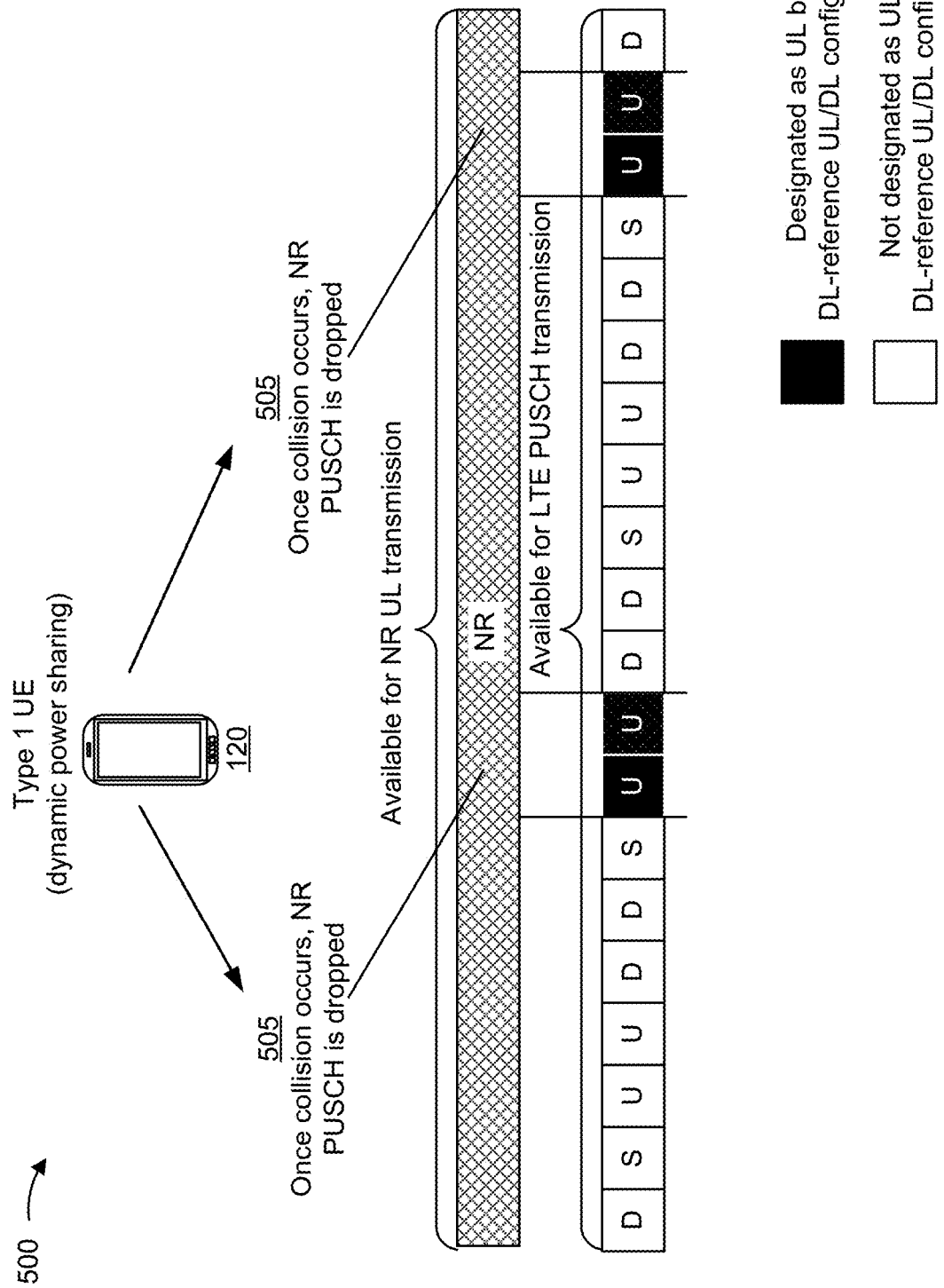
FIGS. 5-9 are diagrams illustrating examples of handling single uplink transmissions in a dual connectivity mode, in accordance with various aspects of the present disclosure.

FIG. 5 is a diagram illustrating an example 500 of handling single uplink transmissions in a dual connectivity mode, in accordance with various aspects of the present disclosure.

As shown in FIG. 5, a type 1 UE (e.g., UE 120) may be configured with a TDD UL/DL configuration (e.g., for an LTE PCell) that indicates a pattern of UL subframes, DL subframes, and/or S subframes in an LTE radio frame, as described above. As further shown, the UE may also be configured with a DL-reference UL/DL configuration, as described above. As shown, the DL-reference UL/DL configuration may indicate one or more uplink subframes of the TDD UL/DL configuration that are designated as uplink subframes for HARQ feedback of downlink LTE communications. In example 500, the UE is configured with LTE TDD UL/DL configuration #1 and DL-reference UL/DL configuration #4, as described above in connection with FIG. 3. The TDD UL/DL configuration and/or the DL-reference UL/DL configuration may be indicated to the UE by a base station 110, such as in a system information block (SIB), a radio resource control (RRC) message, and/or the like.

As shown by reference number 505, for a type 1 UE operating in a single uplink transmission mode in ENDC with a TDD PCell, if there is a collision between an uplink communication on LTE and an uplink communication on NR, then the UE may drop the NR uplink communication and may transmit the LTE uplink communication. In some aspects, the LTE uplink communication may include an LTE PUSCH communication, an LTE PUCCH communication, an LTE PRACH communication, an LTE SRS, and/or the like. Similarly, the NR uplink communication may include an NR PUSCH communication, an NR PUCCH communication, an NR PRACH communication, an NR SRS, and/or the like. By dropping NR uplink communications in favor of LTE uplink communications in the uplink subframes designated as uplink by the DL-reference UL/DL configuration, the UE may avoid a collision. However, this may degrade NR performance.

As indicated above, FIG. 5 is provided merely as an example. Other examples may differ from what is described with regard to FIG. 5.

Figure 6:
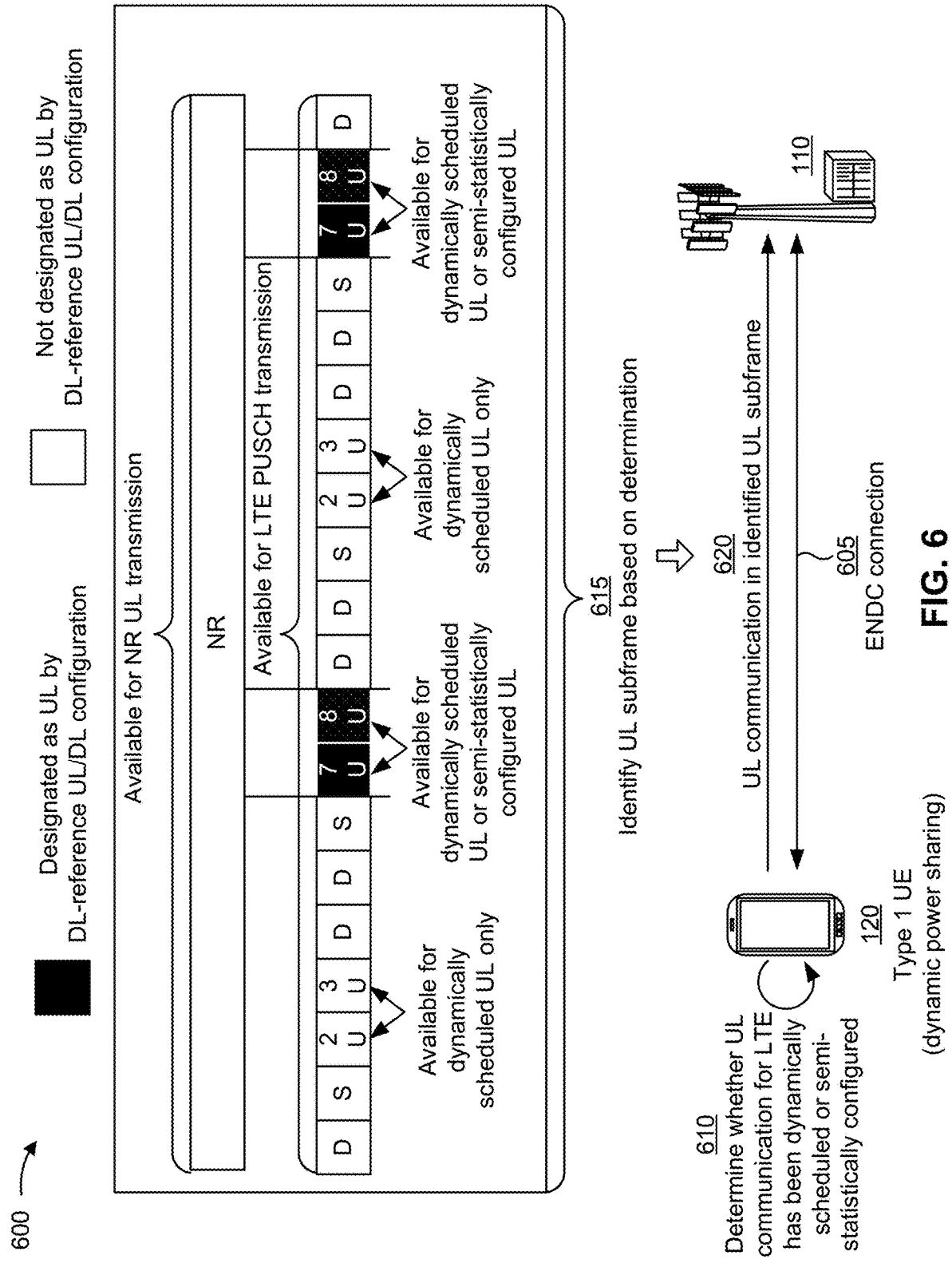

FIG. 6 is a diagram illustrating an example 600 of handling single uplink transmissions in a dual connectivity mode, in accordance with various aspects of the present disclosure. As shown in FIG. 6, a type 1 UE (e.g., UE 120) and a base station 110 may communicate with one another. In example 600, the UE may operate in a single transmission switched uplink mode, may have a dynamic power sharing capability, and may be configured with an LTE PCell (or a PCell of a first radio access technology (RAT)) that uses frame structure type 2 (e.g., TDD).

As shown in FIG. 6, the type 1 UE may be configured with a TDD UL/DL configuration for an LTE PCell and may be configured with a DL-reference UL/DL configuration, as described above. As shown, the DL-reference UL/DL configuration may indicate one or more uplink subframes of the TDD UL/DL configuration that are designated as uplink. In example 600, the UE is configured with LTE TDD UL/DL configuration #1 and DL-reference UL/DL configuration #4, as described above in connection with FIG. 3. The TDD UL/DL configuration and/or the DL-reference UL/DL configuration may be indicated to the UE by the base station 110, such as in a SIB, an RRC message, and/or the like.

As shown by reference number 605, the UE may be in an ENDC mode with one or more base stations 110. In some aspects, the UE may operate in the ENDC mode via a connection with a first base station 110 that operates using a first radio access technology (RAT) and a connection with a second base station 110 that operates using a second RAT. Alternatively, the UE may operate in the ENDC mode via multiple connections with a single base station 110 capable of multi-RAT operation. In the ENDC mode, the first RAT is an LTE RAT and the second RAT is an NR RAT, and one or more cells of the LTE RAT are configured in a master cell group (MCG), while one or more cells of the NR RAT are configured in a secondary cell group (SCG). Although some aspects are described herein in connection with an ENDC mode with the LTE RAT being associated with an MCG and the NR RAT being associated with an SCG, these aspects may apply to other types of dual connectivity modes with a first RAT being associated with an MCG and a second RAT being associated with an SCG.

As shown by reference number 610, the UE may determine whether an uplink communication for the first RAT (e.g., an LTE RAT in example 600) has been dynamically scheduled or semi-statically configured. In some aspects, an uplink communication may be dynamically scheduled if the uplink communication is scheduled by downlink control information (DCI). Additionally, or alternatively, a dynamically scheduled uplink communication may include a PUSCH communication scheduled by DCI (e.g., which may exclude PUSCH communications scheduled using a configured grant indicated in an RRC message), an aperiodic SRS, and/or the like.

In some aspects, an uplink communication may be semi-statically configured if the uplink communication is configured by an RRC message, a medium access control (MAC) control element (CE) (MAC-CE), and/or the like. Additionally, or alternatively, a semi-statically configured uplink communication may include a PUSCH communication scheduled by an RRC message (e.g., using a configured grant), a periodic SRS, a semi-persistent SRS, a PUCCH communication (e.g., a PUCCH communication that includes CSI, a PUCCH communication that includes a scheduling request, and/or the like), a PRACH communication, and/or the like.

In some aspects, different types of PRACH communications may be considered dynamically scheduled or semi-statically configured. For example, a dynamically scheduled uplink communication may include a PRACH communication for contention-free random access (CFRA), a physical downlink control channel (PDCCH)-ordered PRACH communication (e.g., a PRACH communication scheduled by DCI or a PDCCH-order), and/or the like. As another example, a semi-statically configured uplink communication may include a PRACH communication for contention-based random access (CBRA). Alternatively, a dynamically configured uplink communication may include a PRACH communication for CBRA.

As shown by reference number 615, the UE may identify an uplink subframe for transmission of the uplink communication based at least in part on whether the uplink communication has been dynamically scheduled or semi-statically configured. Additionally, or alternatively, the UE may identify the uplink subframe based at least in part on a DL-reference UL/DL configuration. For example, if the uplink communication is dynamically scheduled, then any uplink subframe of the TDD UL/DL configuration may be used for transmission of the uplink communication regardless of whether the uplink subframe is designated as uplink by the DL-reference UL/DL configuration. In this case, uplink subframes 2, 3, 7, and 8 are available for transmission of dynamically scheduled uplink communications in example 600. Additionally, or alternatively, if the uplink communication is semi-statically configured, then only uplink subframes of the TDD UL/DL configuration that are designated as uplink by the DL-reference UL/DL configuration may be used for transmission of the uplink communication. In this case, uplink subframes 7 and 8 (and not 2 and 3) are available for transmission of semi-statically configured uplink communications.

Thus, if the uplink communication is dynamically scheduled, then the uplink communication is not limited to uplink subframes (e.g., of the TDD UL/DL configuration) designated as uplink by the DL-reference UL/DL configuration. Conversely, if the uplink communication is semi-statically configured, then the uplink communication is limited to uplink subframes designated as uplink by the DL-reference UL/DL configuration. As a result, a first set of uplink subframes, permitted for transmission of the uplink communication when the uplink communication is dynamically scheduled, may be different from a second set of uplink subframes permitted for transmission of the uplink communication when the uplink communication is semi-statically configured. For example, the first set of uplink subframes may include uplink subframes designated as uplink by the DL-reference UL/DL configuration and may also include uplink subframes not designated as uplink by the DL-reference UL/DL configuration, while the second set of uplink subframes may include uplink subframes designated as uplink by the DL-reference UL/DL configuration and may exclude uplink subframes not designated as uplink by the DL-reference UL/DL configuration. In example 600, the first set of uplink subframes includes only subframes 2, 3, 7, and 8, and the second set of uplink subframes includes only subframes 7 and 8.

As shown by reference number 620, the UE may transmit the uplink communication in the identified uplink subframe. In some aspects, if the uplink communication is scheduled and/or configured to occur in the identified uplink subframe (e.g., a permitted uplink subframe, depending on whether the uplink communication is dynamically scheduled or semi-statically configured), then the UE may transmit the uplink communication in the identified uplink subframe. Alternatively, if the uplink communication is scheduled and/or configured to occur in a different subframe than an identified subframe (e.g., an uplink subframe in which transmission is not permitted, depending on whether the uplink communication is dynamically scheduled or semi-statically configured), then the UE may drop the uplink communication in the identified uplink subframe.

By permitting the UE to identify an uplink subframe, for an uplink communication, from different sets of uplink subframes depending on whether the uplink communication is dynamically scheduled or semi-statically configured, performance of LTE and NR may be balanced. For example, the base station 110 and the UE may have increased flexibility for dynamic scheduling of uplink communication in LTE. This increased flexibility may result in lower performance degradation of NR than allowing semi-statically configured uplink communications to be transmitted in any uplink subframe, because there are typically fewer dynamically scheduled uplink communications than semi-statically configured uplink communications. By limiting semi-statically configured uplink communications to subframes designated as uplink by the DL-reference UL/DL configuration, NR performance degradation may not be impacted by these semi-statically configured uplink communications, which are typically more numerous and periodic than dynamically scheduled uplink communications. In some aspects, performance may be further improved by multiplexing some uplink communications that would otherwise be dropped, as described below in connection with FIG. 7.

As indicated above, FIG. 6 is provided merely as an example. Other examples may differ from what is described with regard to FIG. 6.

Figure 7:
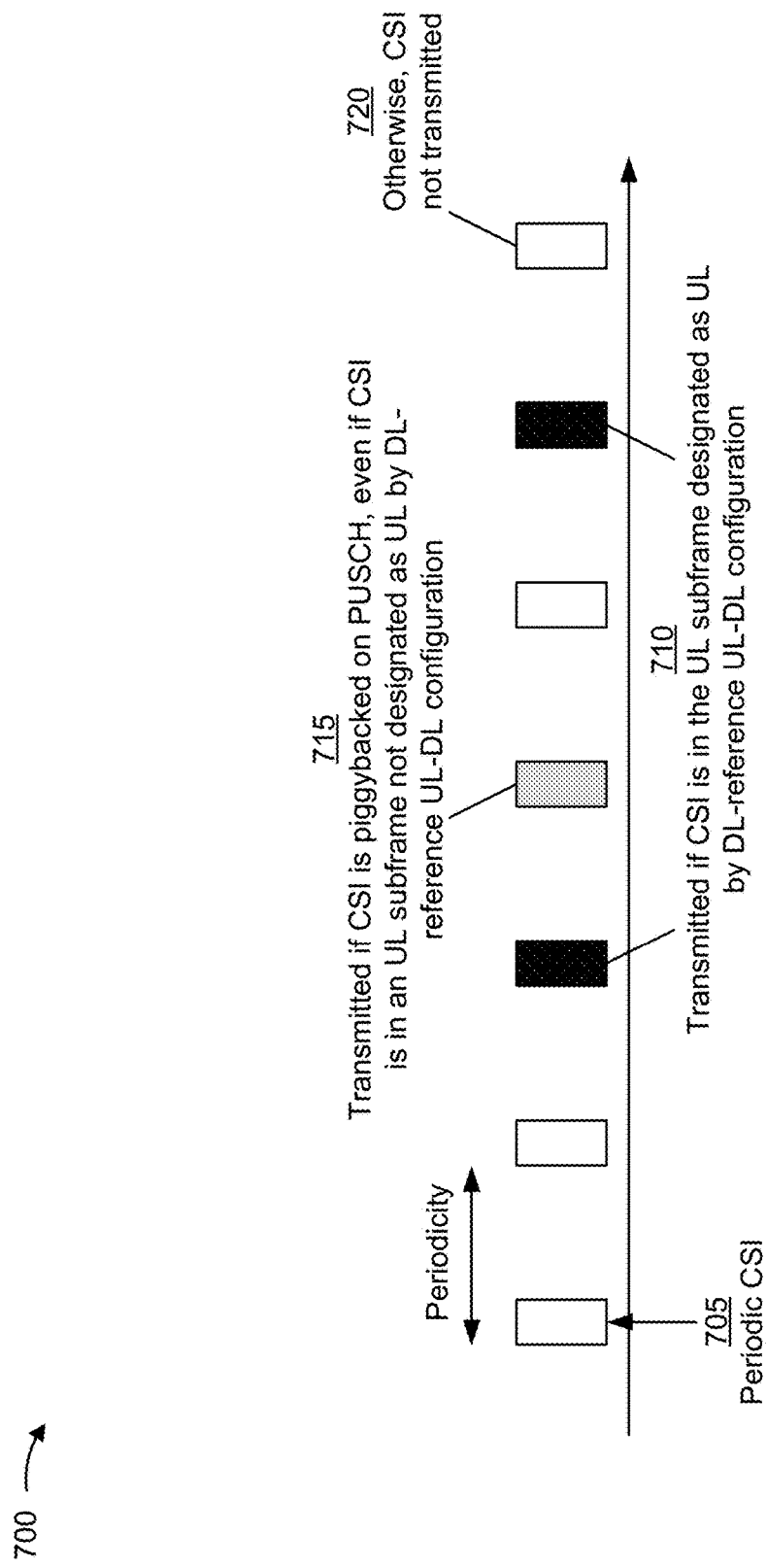

FIG. 7 is a diagram illustrating another example 700 of handling single uplink transmissions in a dual connectivity mode, in accordance with various aspects of the present disclosure.

As shown by reference number 705, a UE may be configured with periodic CSI, which is considered a semi-statically configured uplink communication. For example, an RRC message (e.g., an RRC configuration message, an RRC reconfiguration message, and/or the like) may configure the periodic CSI and a corresponding periodicity. As described above in connection with FIG. 6, because the periodic CSI is semi-statically configured, the uplink subframes in which the periodic CSI is permitted to be transmitted may be limited to uplink subframes designated as uplink by the DL-reference UL/DL configuration. Thus, as shown by reference number 710, if a periodic CSI is configured to occur in an uplink subframe designated as uplink by the DL-reference UL/DL configuration, then the UE may transmit the periodic CSI. Also, the UE may drop periodic CSI configured to occur (e.g., according to a configured periodicity) in an uplink subframe that is not designated as uplink by the DL-reference UL/DL configuration.

However, if a dynamically scheduled PUSCH communication is scheduled to occur in the uplink subframe in which the periodic CSI is configured to occur (e.g., an uplink subframe that is not designated as uplink by the DL-reference UL/DL configuration), then the UE may multiplex (e.g., piggyback) the periodic CSI in the PUSCH communication. For example, as shown by reference number 715, if a dynamically scheduled PUSCH communication is scheduled to occur in the same uplink subframe as periodic CSI, and that uplink subframe is not designated as uplink by the DL-reference UL/DL configuration, then the UE may multiplex (e.g., piggyback) the periodic CSI with the PUSCH communication (e.g., may transmit the periodic CSI on the PUSCH). In some aspects, the UE may multiplex the periodic CSI with a PUSCH communication regardless of whether the PUSCH communication is scheduled to be transmitted in an uplink subframe designated as uplink or an uplink subframe not designated as uplink.

As shown by reference number 720, if a periodic CSI is scheduled to occur in an uplink subframe not designated as uplink by the DL-reference UL/DL configuration, and there is not a PUSCH communication scheduled to occur in the same uplink subframe as the periodic CSI, then the UE may drop the periodic CSI.

In this way, performance may be improved by multiplexing some uplink communications that would otherwise be dropped (e.g., periodic CSI). Although FIG. 7 is described in connection with periodic CSI, in some aspects, other types of dynamically scheduled uplink communications may be multiplexed with a PUSCH communication in the manner described herein in connection with FIG. 7.

As indicated above, FIG. 7 is provided merely as an example. Other examples may differ from what is described with regard to FIG. 7.

Figure 8:
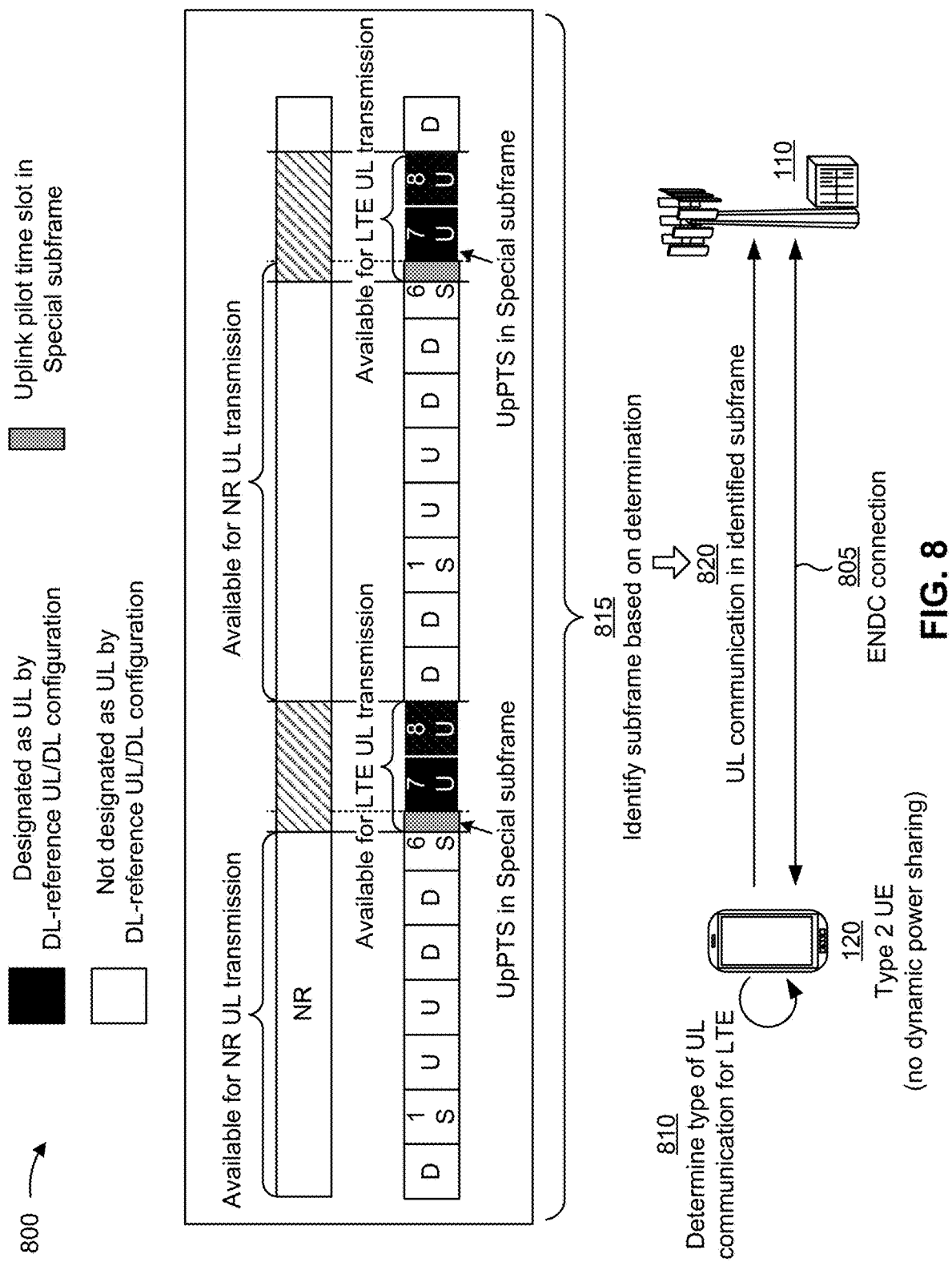

FIG. 8 is a diagram illustrating another example 800 of handling single uplink transmissions in a dual connectivity mode, in accordance with various aspects of the present disclosure. As shown in FIG. 8, a type 2 UE (e.g., UE 120) and a base station 110 may communicate with one another. In example 800, the UE may operate in a single transmission switched uplink mode, may not have a dynamic power sharing capability, and may be configured with an LTE PCell (or a PCell of a first RAT) that uses frame structure type 2 (e.g., TDD).

As shown in FIG. 8, the type 2 UE may be configured with a TDD UL/DL configuration for an LTE PCell and may be configured with a DL-reference UL/DL configuration, as described above. As shown, the DL-reference UL/DL configuration may indicate one or more uplink subframes of the TDD UL/DL configuration that are designated as uplink. In example 800, the UE is configured with LTE TDD UL/DL configuration #1 and DL-reference UL/DL configuration #4, as described above in connection with FIGS. 3 and 4. The TDD UL/DL configuration and/or the DL-reference UL/DL configuration may be indicated to the UE by the base station 110, such as in a SIB, an RRC message, and/or the like.

As shown by reference number 805, the UE may be in an ENDC mode with one or more base stations 110, as described above in connection with FIG. 6. In the ENDC mode, the first RAT is an LTE RAT and the second RAT is an NR RAT, and one or more cells of the LTE RAT are configured in an MCG, while one or more cells of the NR RAT are configured in an SCG. Although some aspects are described herein in connection with an ENDC mode with the LTE RAT being associated with an MCG and the NR RAT being associated with an SCG, these aspects may apply to other types of dual connectivity modes with a first RAT being associated with an MCG and a second RAT being associated with an SCG.

As shown by reference number 810, the UE may determine a type of an uplink communication (e.g., an uplink communication type) for the first RAT (e.g., an LTE RAT in example 800). Example uplink communication types include PUSCH communications, PUCCH communications, PRACH communications, SRSs, and/or the like.

As shown by reference number 815, the UE may identify a subframe for transmission of the uplink communication based at least in part on the uplink communication type. Additionally, or alternatively, the UE may identify the subframe based at least in part on a DL-reference UL/DL configuration. For example, if the uplink communication is a first type of uplink communication (e.g., a PUSCH communication and/or a PUCCH communication), then only uplink subframes of the TDD UL/DL configuration that are designated as uplink by the DL-reference UL/DL configuration may be used for transmission of the uplink communication. In this case, only uplink subframes 7 and 8 are available for transmission of the first type of uplink communication (e.g., PUSCH communications and/or PUCCH communications) in example 800.

Additionally, or alternatively, if the uplink communication is a second type of uplink communication (e.g., a PRACH communication and/or an SRS), then uplink subframes of the TDD UL/DL configuration that are designated as uplink may be used for transmission of the uplink communication, and special subframes that immediately precede an uplink subframe designated as uplink may also be used for transmission of the uplink communication. For example, the UE may use an uplink pilot time slot (UpPTS) of a special subframe, that immediately precedes an uplink subframe designated as uplink, for transmission of the second type of uplink communications. In this case, uplink subframes 7 and 8, as well as the UpPTS of special subframe 6, are available for transmission of the second type of uplink communication (e.g., PRACH communications and/or SRSs) in example 800. However, the UpPTS of special subframe 1 is not available for transmission of the second type of uplink communication, because special subframe 1 does not immediately precede an uplink subframe designated as uplink (e.g., special subframe 1 immediately precedes an uplink subframe not designated as uplink by the DL-reference UL/DL configuration).

Thus, if the uplink communication is a first type of communication, such as a PUSCH communication or a PUCCH communication, then the uplink communication is limited to uplink subframes (e.g., of the TDD UL/DL configuration) designated as uplink by the DL-reference UL/DL configuration. However, if the uplink communication is a second type of communication, such as a PRACH communication or an SRS, then the uplink communication is limited to a set of subframes that includes uplink subframes designated as uplink by the DL-reference UL/DL configuration and special subframes that immediately precede an uplink subframe designated as uplink by the DL-reference UL/DL configuration. As a result, a first set of subframes, permitted for transmission of a first type of uplink communication, may be different from a second set of subframes permitted for transmission of a second type of uplink communication. In example 800, the first set of uplink subframes includes only subframes 7 and 8, and the second set of uplink subframes includes only subframes 6 (e.g., an UpPTS of subframe 6), 7, and 8.

As shown by reference number 820, the UE may transmit the uplink communication in the identified subframe. In some aspects, if the uplink communication is scheduled and/or configured to occur in the identified subframe (e.g., a permitted subframe, depending on whether the uplink communication is a first type of uplink communication or second type of uplink communication), then the UE may transmit the uplink communication in the identified subframe. Alternatively, if the uplink communication is scheduled and/or configured to occur in a different subframe than an identified subframe (e.g., a subframe in which transmission is not permitted, depending on whether the uplink communication is a first type of uplink communication or second type of uplink communication), then the UE may drop the uplink communication in the identified subframe.

By permitting transmission of the second type of uplink communication (e.g., PRACH communications and/or SRSs) to UpPTSs of special subframes that immediately precede an uplink subframe designated as uplink, transmission opportunities for the second type of communication may be increased while avoiding frequent switching between LTE and NR.

As indicated above, FIG. 8 is provided merely as an example. Other examples may differ from what is described with regard to FIG. 8.

Figure 9:
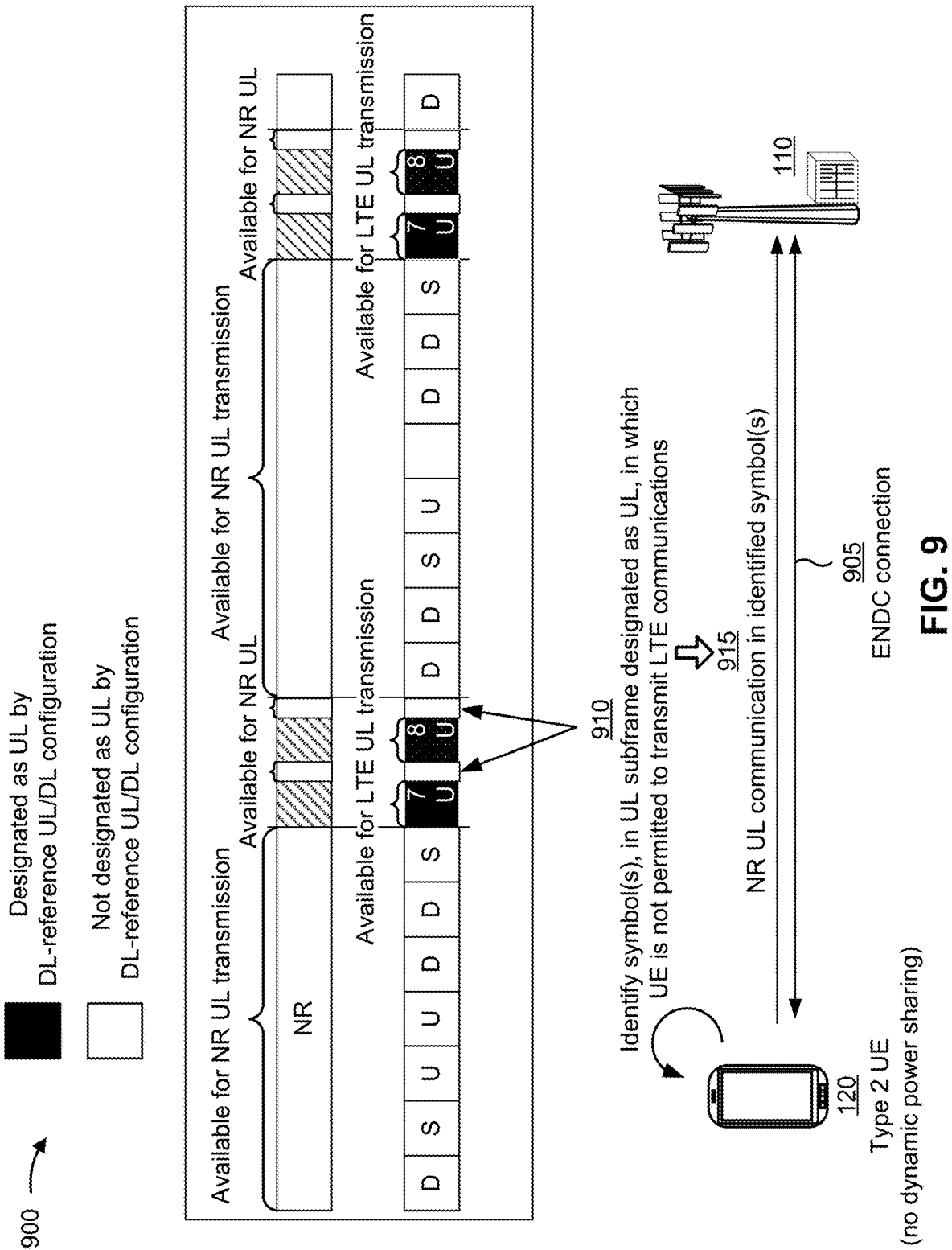

FIG. 9 is a diagram illustrating another example 900 of handling single uplink transmissions in a dual connectivity mode, in accordance with various aspects of the present disclosure. As shown in FIG. 9, a type 2 UE (e.g., UE 120) and a base station 110 may communicate with one another. In example 900, the UE may operate in a single transmission switched uplink mode, may not have a dynamic power sharing capability, and may be configured with an LTE PCell (or a PCell of a first RAT) that uses frame structure type 2 (e.g., TDD).

As shown in FIG. 9, the type 2 UE may be configured with a TDD UL/DL configuration for an LTE PCell and may be configured with a DL-reference UL/DL configuration, as described above. As shown, the DL-reference UL/DL configuration may indicate one or more uplink subframes of the TDD UL/DL configuration that are designated as uplink. In example 900, the UE is configured with LTE TDD UL/DL configuration #1 and DL-reference UL/DL configuration #4, as described above in connection with FIGS. 3 and 4. The TDD UL/DL configuration and/or the DL-reference UL/DL configuration may be indicated to the UE by the base station 110, such as in a SIB, an RRC message, and/or the like.

As shown by reference number 905, the UE may be in an ENDC mode with one or more base stations 110, as described above in connection with FIG. 6. In the ENDC mode, the first RAT is an LTE RAT and the second RAT is an NR RAT, and one or more cells of the LTE RAT are configured in an MCG, while one or more cells of the NR RAT are configured in an SCG. Although some aspects are described herein in connection with an ENDC mode with the LTE RAT being associated with an MCG and the NR RAT being associated with an SCG, these aspects may apply to other types of dual connectivity modes with a first RAT being associated with an MCG and a second RAT being associated with an SCG.

As shown by reference number 910, the UE may identify one or more symbols, in an uplink subframe designated as uplink by the DL-reference UL/DL configuration, in which the UE is not permitted to transmit an uplink communication for the first RAT (e.g., an LTE uplink communication). In some aspects, the UE may identify the one or more symbols based at least in part on upper layer signaling, such as system information (e.g., a SIB and/or the like), an RRC message, and/or the like. In some aspects, the one or more symbols may be configured for cell-specific SRS in LTE. For example, the one or more symbols may be configured for cell-specific SRS for one or more other UEs, and the UE may blank or may mute transmissions (e.g., may refrain from transmitting) in the one or more symbols to reduce interference with SRS transmitted by the other UE(s). In example 900, an LTE cell-specific SRS is configured in the last symbol of each of subframes 7 and 8.

As shown by reference number 915, the UE may transmit an uplink communication for the second RAT (e.g., an NR uplink communication) in the identified symbol(s). Because the UE is configured to blank or mute LTE uplink transmissions on the one or more symbols, spectral efficiency may be improved by using those one or more symbols for NR uplink transmissions.

As indicated above, FIG. 9 is provided merely as an example. Other examples may differ from what is described with regard to FIG. 9.

Figure 10:
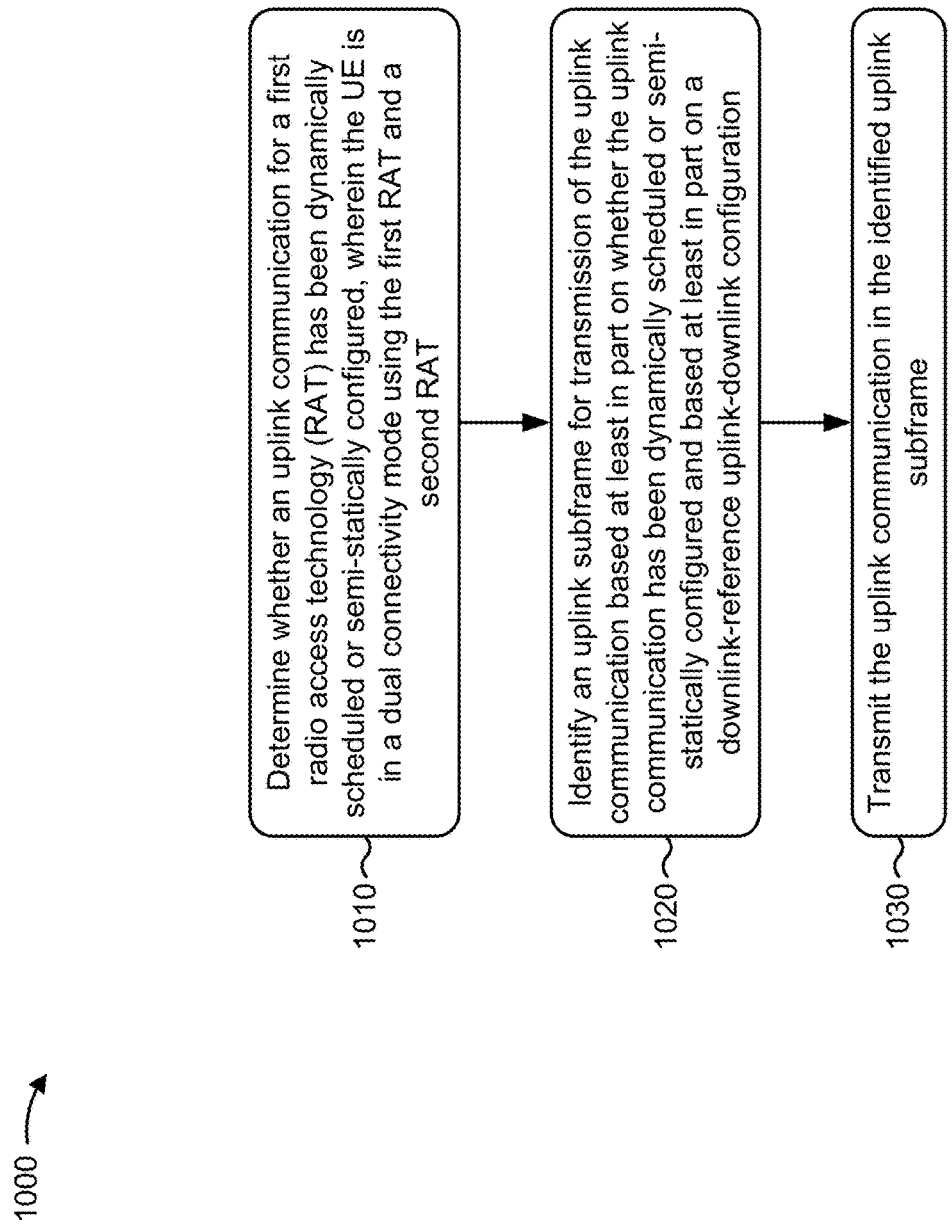
FIGS. 10-12 are diagrams illustrating example processes performed, for example, by a user equipment, in accordance with various aspects of the present disclosure.

FIG. 10 is a diagram illustrating an example process 1000 performed, for example, by a UE, in accordance with various aspects of the present disclosure. Example process 1000 is an example where a UE (e.g., UE 120 and/or the like) performs operations associated with handling single uplink transmissions in a dual connectivity mode.

As shown in FIG. 10, in some aspects, process 1000 may include determining whether an uplink communication for a first RAT has been dynamically scheduled or semi-statically configured, wherein the UE is in a dual connectivity mode using the first RAT and a second RAT (block 1010). For example, the UE (e.g., using receive processor 258, transmit processor 264, controller/processor 280, memory 282, and/or the like) may determine whether an uplink communication for a first RAT has been dynamically scheduled or semi-statically configured, as described above. In some aspects, the UE is in a dual connectivity mode using the first RAT and a second RAT.

As further shown in FIG. 10, in some aspects, process 1000 may include identifying an uplink subframe for transmission of the uplink communication based at least in part on whether the uplink communication has been dynamically scheduled or semi-statically configured, and based at least in part on a downlink-reference uplink-downlink configuration (block 1020). For example, the UE (e.g., using receive processor 258, transmit processor 264, controller/processor 280, memory 282, and/or the like) may identify an uplink subframe for transmission of the uplink communication based at least in part on whether the uplink communication has been dynamically scheduled or semi-statically configured, and based at least in part on a downlink-reference uplink-downlink configuration, as described above.

As further shown in FIG. 10, in some aspects, process 1000 may include transmitting the uplink communication in the identified uplink subframe (block 1030). For example, the UE (e.g., using transmit processor 264, controller/processor 280, memory 282, and/or the like) may transmit the uplink communication in the identified uplink subframe, as described above.

Process 1000 may include additional aspects, such as any single aspect or any combination of aspects described below and/or in connection with one or more other processes described elsewhere herein.

In a first aspect, the UE is in a single transmission switched uplink mode, the UE has a dynamic power sharing capability, and a primary cell of the first RAT uses frame structure type 2.

In a second aspect, alone or in combination with the first aspect, the identified uplink subframe is not limited to uplink subframes designated as uplink by the downlink-reference uplink-downlink configuration if the uplink communication has been dynamically scheduled.

In a third aspect, alone or in combination with one or more of the first and second aspects, the identified uplink subframe is limited to uplink subframes designated as uplink by the downlink-reference uplink-downlink configuration if the uplink communication has been semi-statically configured.

In a fourth aspect, alone or in combination with one or more of the first through third aspects, a first set of uplink subframes, permitted for transmission of the uplink communication when the uplink communication is dynamically scheduled, is different from a second set of uplink subframes permitted for transmission of the uplink communication when the uplink communication is semi-statically configured.

In a fifth aspect, alone or in combination with one or more of the first through fourth aspects, the first set of uplink subframes includes uplink subframes designated as uplink by the downlink-reference uplink-downlink configuration, and also includes uplink subframes not designated as uplink by the downlink-reference uplink-downlink configuration.

In a sixth aspect, alone or in combination with one or more of the first through fifth aspects, the second set of uplink subframes includes uplink subframes designated as uplink by the downlink-reference uplink-downlink configuration, and excludes uplink subframes not designated as uplink by the downlink-reference uplink-downlink configuration.

In a seventh aspect, alone or in combination with one or more of the first through sixth aspects, the identified uplink subframe is not limited to uplink subframes designated as uplink by the downlink-reference uplink-downlink configuration if the uplink communication has been scheduled by downlink control information.

In an eighth aspect, alone or in combination with one or more of the first through seventh aspects, the identified uplink subframe is limited to uplink subframes designated as uplink by the downlink-reference uplink-downlink configuration if the uplink communication has been configured by at least one of a radio resource control message or a medium access control message.

In a ninth aspect, alone or in combination with one or more of the first through eighth aspects, the identified uplink subframe is not limited to uplink subframes designated as uplink by the downlink-reference uplink-downlink configuration if the uplink communication is a physical uplink shared channel communication scheduled by downlink control information or is an aperiodic sounding reference signal.

In a tenth aspect, alone or in combination with one or more of the first through ninth aspects, the identified uplink subframe is limited to uplink subframes designated as uplink by the downlink-reference uplink-downlink configuration if the uplink communication is a configured grant physical uplink shared channel communication, a periodic or semi-persistent sounding reference signal, a physical uplink control channel communication, or a physical random access channel communication.

In an eleventh aspect, alone or in combination with one or more of the first through tenth aspects, the identified uplink subframe is limited to uplink subframes designated as uplink by the downlink-reference uplink-downlink configuration if the uplink communication is a PUCCH communication that includes channel state information or a scheduling request.

In a twelfth aspect, alone or in combination with one or more of the first through eleventh aspects, the identified uplink subframe is not limited to uplink subframes designated as uplink by the downlink-reference uplink-downlink configuration if the uplink communication is at least one of a PRACH communication for contention-free random access or a PDCCH-ordered PRACH communication.

In a thirteenth aspect, alone or in combination with one or more of the first through twelfth aspects, the identified uplink subframe is limited to uplink subframes designated as uplink by the downlink-reference uplink-downlink configuration if the uplink communication is a physical random access channel communication for contention-based random access.

In a fourteenth aspect, alone or in combination with one or more of the first through thirteenth aspects, the identified uplink subframe is not limited to uplink subframes designated as uplink by the downlink-reference uplink-downlink configuration if the uplink communication is a physical random access channel communication for contention-based random access.

In a fifteenth aspect, alone or in combination with one or more of the first through fourteenth aspects, the uplink communication is a dynamically scheduled PUSCH communication and the identified uplink subframe is not designated as uplink by the downlink-reference uplink-downlink configuration, and the UE is configured to multiplex periodic channel state information, configured in the identified uplink subframe, with the PUSCH communication.

In a sixteenth aspect, alone or in combination with one or more of the first through fifteenth aspects, one or more cells of the first RAT are configured in a first cell group and one or more cells of the second RAT are configured in a second cell group.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
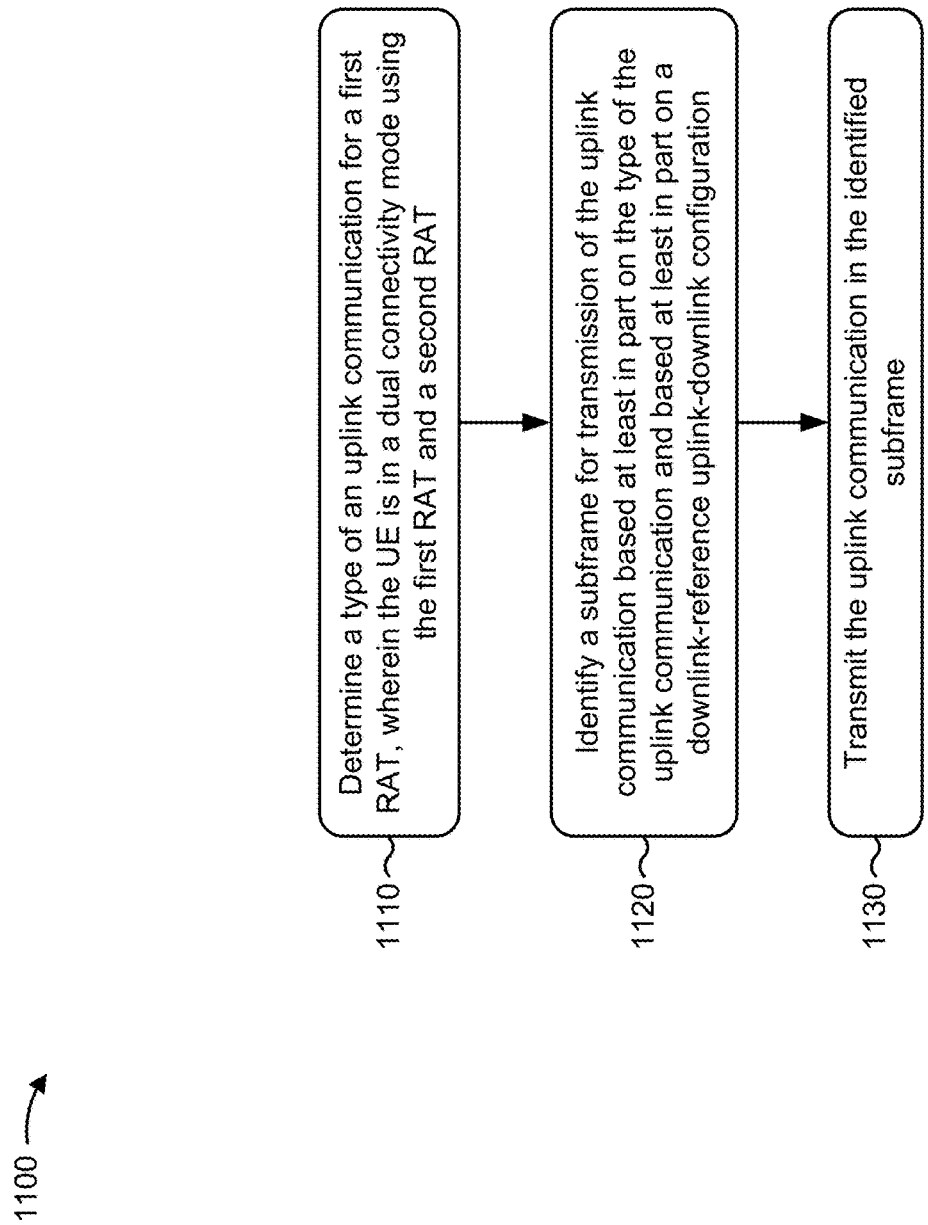

FIG. 11 is a diagram illustrating an example process 1100 performed, for example, by a UE, in accordance with various aspects of the present disclosure. Example process 1100 is an example where a UE (e.g., UE 120 and/or the like) performs operations associated with handling single uplink transmissions in a dual connectivity mode.

As shown in FIG. 11, in some aspects, process 1100 may include determining a type of an uplink communication for a first RAT, wherein the UE is in a dual connectivity mode using the first RAT and a second RAT (block 1110). For example, the UE (e.g., using receive processor 258, transmit processor 264, controller/processor 280, memory 282, and/or the like) may determine a type of an uplink communication for a first RAT, as described above. In some aspects, the UE is in a dual connectivity mode using the first RAT and a second RAT.

As further shown in FIG. 11, in some aspects, process 1100 may include identifying a subframe for transmission of the uplink communication based at least in part on the type of the uplink communication and based at least in part on a downlink-reference uplink-downlink configuration (block 1120). For example, the UE (e.g., using receive processor 258, transmit processor 264, controller/processor 280, memory 282, and/or the like) may identify a subframe for transmission of the uplink communication based at least in part on the type of the uplink communication and based at least in part on a downlink-reference uplink-downlink configuration, as described above.

As further shown in FIG. 11, in some aspects, process 1100 may include transmitting the uplink communication in the identified subframe (block 1130). For example, the UE (e.g., using transmit processor 264, controller/processor 280, memory 282, and/or the like) may transmit the uplink communication in the identified subframe, as described above.

Process 1100 may include additional aspects, such as any single aspect or any combination of aspects described below and/or in connection with one or more other processes described elsewhere herein.

In a first aspect, the UE is in a single transmission switched uplink mode, the UE does not have a dynamic power sharing capability, and a primary cell of the first RAT uses frame structure type 2.

In a second aspect, alone or in combination with the first aspect, the identified subframe is limited to uplink subframes designated as uplink by the downlink-reference uplink-downlink configuration if the uplink communication is a physical uplink shared channel communication or a physical uplink control channel communication.

In a third aspect, alone or in combination with one or more of the first and second aspects, the identified subframe is limited to uplink subframes designated as uplink by the downlink-reference uplink-downlink configuration or to special subframes that immediately precede an uplink subframe designated as uplink by the downlink-reference uplink-downlink configuration if the uplink communication is a sounding reference signal or a physical random access channel communication.

In a fourth aspect, alone or in combination with one or more of the first through third aspects, the uplink communication is transmitted in an uplink pilot time slot of a special subframe that immediately precedes an uplink subframe designated as uplink by the downlink-reference uplink-downlink configuration.

In a fifth aspect, alone or in combination with one or more of the first through fourth aspects, one or more cells of the first RAT are configured in a first cell group and one or more cells of the second RAT are configured in a second cell group.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
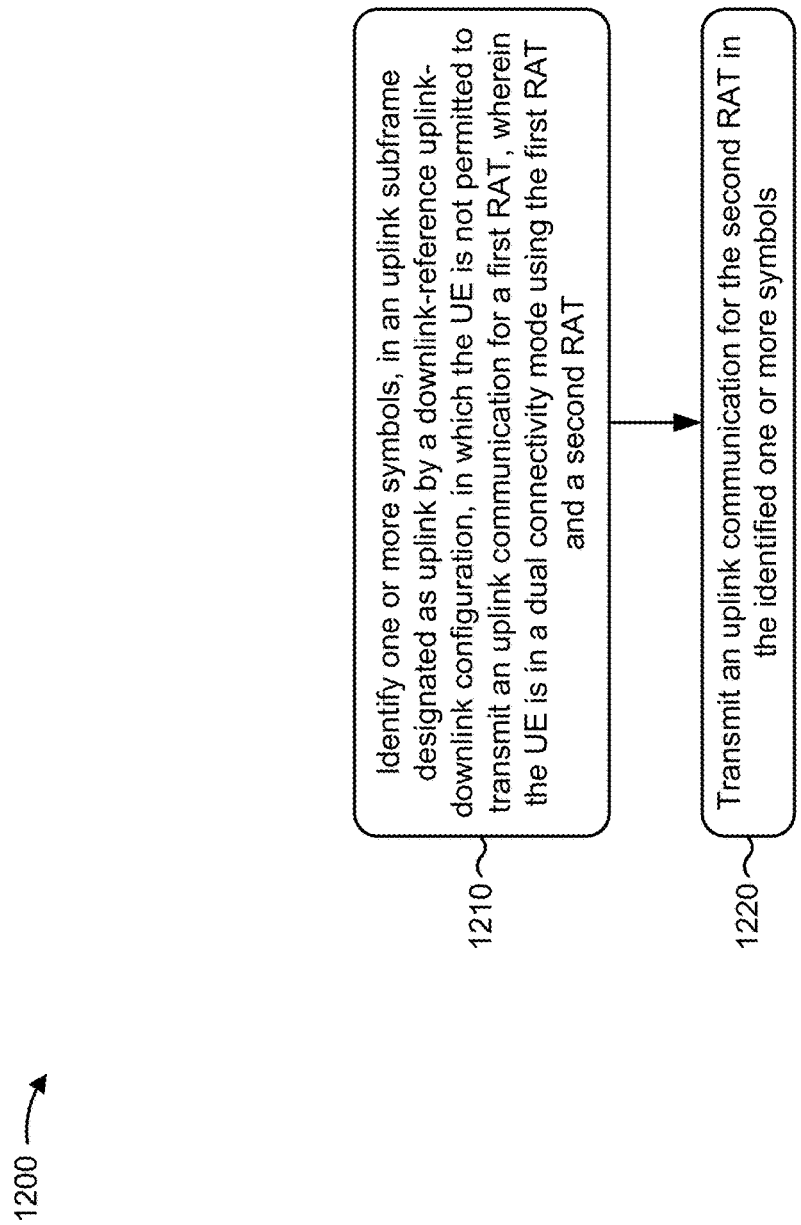

FIG. 12 is a diagram illustrating an example process 1200 performed, for example, by a UE, in accordance with various aspects of the present disclosure. Example process 1200 is an example where a UE (e.g., UE 120 and/or the like) performs operations associated with handling single uplink transmissions in a dual connectivity mode.

As shown in FIG. 12, in some aspects, process 1200 may include identifying one or more symbols, in an uplink subframe designated as uplink by a downlink-reference uplink-downlink configuration, in which the UE is not permitted to transmit an uplink communication for a first RAT, wherein the UE is in a dual connectivity mode using the first RAT and a second RAT (block 1210). For example, the UE (e.g., using receive processor 258, transmit processor 264, controller/processor 280, memory 282, and/or the like) may identify one or more symbols, in an uplink subframe designated as uplink by a downlink-reference uplink-downlink configuration, in which the UE is not permitted to transmit an uplink communication for a first RAT, as described above. In some aspects, the UE is in a dual connectivity mode using the first RAT and a second RAT.

As further shown in FIG. 12, in some aspects, process 1200 may include transmitting an uplink communication for the second RAT in the identified one or more symbols (block 1220). For example, the UE (e.g., using transmit processor 264, controller/processor 280, memory 282, and/or the like) may transmit an uplink communication for the second RAT in the identified one or more symbols, as described above.

Process 1200 may include additional aspects, such as any single aspect or any combination of aspects described below and/or in connection with one or more other processes described elsewhere herein.

In a first aspect, the UE is in a single transmission switched uplink mode, the UE does not have a dynamic power sharing capability, and a primary cell of the first RAT uses frame structure type 2.

In a second aspect, alone or in combination with the first aspect, the one or more symbols are identified based at least in part on upper layer signaling.

In a third aspect, alone or in combination with one or more of the first and second aspects, the upper layer signaling includes at least one of system information or a radio resource control message.

In a fourth aspect, alone or in combination with one or more of the first through third aspects, the one or more symbols are configured for cell-specific sounding reference signals.

In a fifth aspect, alone or in combination with one or more of the first through fourth aspects, one or more cells of the first RAT are configured in a first cell group and one or more cells of the second RAT are configured in a second cell group.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
   determining whether an uplink communication for a first radio access technology (RAT) has been dynamically scheduled or semi-statically configured, wherein the UE is in a dual connectivity mode using the first RAT and a second RAT;
   identifying an uplink subframe for transmission of the uplink communication based at least in part on whether the uplink communication has been dynamically scheduled or semi-statically configured and based at least in part on a downlink-reference uplink-downlink configuration; and
   transmitting the uplink communication in the identified uplink subframe,
   wherein at least one of:
      the identified uplink subframe is a first set of uplink subframes, permitted for transmission of the uplink communication when the uplink communication is dynamically scheduled, or a second set of uplink subframes, different from the first set of uplink subframes, permitted for transmission of the uplink communication when the uplink communication is semi-statically configured, or
      the identified uplink subframe is limited to a first uplink subframe designated as uplink by the downlink-reference uplink-downlink configuration if the uplink communication is at least one of: a configured grant physical uplink shared channel (PUSCH) communication, or a periodic or semi-persistent sounding reference signal, a physical uplink control channel (PUCCH) communication.

2. The method of claim 1, wherein the UE is in a single transmission switched uplink mode, the UE has a dynamic power sharing capability, and a primary cell of the first RAT uses frame structure type 2.

3. The method of claim 1, wherein the identified uplink subframe is not limited to a second uplink subframe designated as uplink by the downlink-reference uplink-downlink configuration if the uplink communication has been dynamically scheduled.

4. The method of claim 1, wherein the identified uplink subframe is limited to a second uplink subframe designated as uplink by the downlink-reference uplink-downlink configuration if the uplink communication has been semi-statically configured.

5. The method of claim 1, wherein the identified uplink subframe is the first set of uplink subframes or the second set of uplink subframes.

6. The method of claim 5, wherein the first set of uplink subframes includes a particular uplink subframe designated as uplink by the downlink-reference uplink-downlink configuration and also includes another particular uplink subframe not designated as uplink by the downlink-reference uplink-downlink configuration.

7. The method of claim 5, wherein the second set of uplink subframes includes a particular uplink subframe designated as uplink by the downlink-reference uplink-downlink configuration and excludes another particular uplink subframe not designated as uplink by the downlink-reference uplink-downlink configuration.

8. The method of claim 1, wherein the identified uplink subframe is not limited to a second uplink subframe designated as uplink by the downlink-reference uplink-downlink configuration if the uplink communication has been scheduled by downlink control information.

9. The method of claim 1, wherein the identified uplink subframe is limited to a second uplink subframe designated as uplink by the downlink-reference uplink-downlink configuration if the uplink communication has been configured by at least one of a radio resource control message or a medium access control message.

10. The method of claim 1, wherein the identified uplink subframe is not limited to a second uplink subframe designated as uplink by the downlink-reference uplink-downlink configuration if the uplink communication is a second PUSCH communication scheduled by downlink control information or is an aperiodic sounding reference signal.

11. The method of claim 1, wherein the identified uplink subframe is limited to the first uplink subframe designated as uplink by the downlink-reference uplink-downlink configuration if the uplink communication is the at least one of: the configured grant PUSCH communication, the periodic or semi-persistent sounding reference signal, or the PUCCH communication.

12. The method of claim 1, wherein the identified uplink subframe is limited to the first uplink subframe designated as uplink by the downlink-reference uplink-downlink configuration if the uplink communication is the PUCCH communication, and wherein the PUCCH communication includes channel state information or a scheduling request.

13. The method of claim 1, wherein the identified uplink subframe is not limited to the second uplink subframe designated as uplink by the downlink-reference uplink-downlink configuration if the uplink communication is the at least one of a second PRACH communication for contention-free random access or a physical downlink control channel (PDCCH)-ordered PRACH communication.

14. The method of claim 1, wherein the identified uplink subframe is limited to a second uplink subframe designated as uplink by the downlink-reference uplink-downlink configuration if the uplink communication is a physical random access channel communication for contention-based random access.

15. The method of claim 1, wherein the identified uplink subframe is not limited to a second uplink subframe designated as uplink by the downlink-reference uplink-downlink configuration if the uplink communication is a physical random access channel communication for contention-based random access.

16. The method of claim 1, wherein the uplink communication is a dynamically scheduled PUSCH communication and the identified uplink subframe is not designated as uplink by the downlink-reference uplink-downlink configuration, and wherein the UE is configured to multiplex periodic channel state information, configured in the identified uplink subframe, with the PUSCH communication.

17. The method of claim 1, wherein one or more cells of the first RAT are configured in a first cell group and one or more cells of the second RAT are configured in a second cell group.

18. A method of wireless communication performed by a user equipment (UE), comprising:
   determining a type of an uplink communication for a first radio access technology (RAT), wherein the UE is in a dual connectivity mode using the first RAT and a second RAT;
   identifying a subframe for transmission of the uplink communication based at least in part on the type of the uplink communication and based at least in part on a downlink-reference uplink-downlink configuration; and transmitting the uplink communication in the identified subframe,
wherein at least one of:
the identified uplink subframe is a first set of uplink subframes, permitted for transmission of the uplink communication when the uplink communication is dynamically scheduled, or a second set of uplink subframes, different from the first set of uplink subframes, permitted for transmission of the uplink communication when the uplink communication is semi-statically configured, or
the identified uplink subframe is limited to a first uplink subframe designated as uplink by the downlink-reference uplink-downlink configuration if the uplink communication is at least one of: a configured grant physical uplink shared channel (PUSCH) communication, or a periodic or semi-persistent sounding reference signal, a physical uplink control channel (PUCCH) communication.

19. The method of claim 18, wherein the UE is in a single transmission switched uplink mode, the UE does not have a dynamic power sharing capability, and a primary cell of the first RAT uses frame structure type 2.

20. The method of claim 18, wherein the identified subframe is limited to a second uplink subframe designated as uplink by the downlink-reference uplink-downlink configuration if the uplink communication is a second PUSCH communication or the PUCCH communication.

21. The method of claim 18, wherein the identified subframe is limited to a second uplink subframe designated as uplink by the downlink-reference uplink-downlink configuration or to special subframes that immediately precede an uplink subframe designated as uplink by the downlink-reference uplink-downlink configuration if the uplink communication is a sounding reference signal or a physical random access channel communication.

22. The method of claim 21, wherein the uplink communication is transmitted in an uplink pilot time slot of a special subframe that immediately precedes the second uplink subframe.

23. The method of claim 18, wherein one or more cells of the first RAT are configured in a first cell group and one or more cells of the second RAT are configured in a second cell group.

24. A user equipment (UE) for wireless communication, comprising:
a memory; and
one or more processors coupled to the memory, the one or more processors configured to:
determine whether an uplink communication for a first radio access technology (RAT) has been dynamically scheduled or semi-statically configured, wherein the UE is in a dual connectivity mode using the first RAT and a second RAT;
identify an uplink subframe for transmission of the uplink communication based at least in part on whether the uplink communication has been dynamically scheduled or semi-statically configured and based at least in part on a downlink-reference uplink-downlink configuration; and
transmit the uplink communication in the identified uplink subframe,
wherein at least one of:
the identified uplink subframe is a first set of uplink subframes, permitted for transmission of the uplink communication when the uplink communication is dynamically scheduled, or a second set of uplink subframes, different from the first set of uplink subframes, permitted for transmission of the uplink communication when the uplink communication is semi-statically configured, or
the identified uplink subframe is limited to a first uplink subframe designated as uplink by the downlink-reference uplink-downlink configuration if the uplink communication is at least one of: a configured grant physical uplink shared channel (PUSCH) communication, or a periodic or semi-persistent sounding reference signal, a physical uplink control channel (PUCCH) communication.

25. The UE of claim 24, wherein the identified uplink subframe is limited to the first uplink subframe designated as uplink by the downlink-reference uplink-downlink configuration if the uplink communication is the at least one of: the configured grant PUSCH communication, the periodic or semi-persistent sounding reference signal, or the PUCCH communication.

26. The UE of claim 24, wherein the identified uplink subframe is limited to the first uplink subframe designated as uplink by the downlink-reference uplink-downlink configuration if the uplink communication is the PUCCH communication, and wherein the PUCCH communication includes channel state information or a scheduling request.

27. An apparatus for wireless communication, comprising:
means for determining whether an uplink communication for a first radio access technology (RAT) has been dynamically scheduled or semi-statically configured, wherein the apparatus is in a dual connectivity mode using the first RAT and a second RAT;
means for identifying an uplink subframe for transmission of the uplink communication based at least in part on whether the uplink communication has been dynamically scheduled or semi-statically configured and based at least in part on a downlink-reference uplink-downlink configuration; and
means for transmitting the uplink communication in the identified uplink subframe,
wherein at least one of:
the identified uplink subframe is a first set of uplink subframes, permitted for transmission of the uplink communication when the uplink communication is dynamically scheduled, or a second set of uplink subframes, different from the first set of uplink subframes, permitted for transmission of the uplink communication when the uplink communication is semi-statically configured, or
the identified uplink subframe is limited to a first uplink subframe designated as uplink by the downlink-reference uplink-downlink configuration if the uplink communication is at least one of: a configured grant physical uplink shared channel (PUSCH) communication, or a periodic or semi-persistent sounding reference signal, a physical uplink control channel (PUCCH) communication.

28. The apparatus of claim 27, wherein the identified uplink subframe is limited to the first uplink subframe designated as uplink by the downlink-reference uplink-downlink configuration if the uplink communication is the at least one of: the configured grant PUSCH communication, the periodic or semi-persistent sounding reference signal, or the PUCCH communication.

29. The apparatus of claim 27, wherein the identified uplink subframe is limited to the first uplink subframe designated as uplink by the downlink-reference uplink-downlink configuration if the uplink communication is the PUCCH communication, and wherein the PUCCH communication includes channel state information or a scheduling request.

* * * * *